US012633981B2

(12) United States Patent
Bar-Or Tillinger et al.

(10) Patent No.: US 12,633,981 B2
(45) Date of Patent: May 19, 2026

(54) CHANNEL COMPRESSION FOR CHANNEL FEEDBACK REPORTING

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 1138 days.

(21) Appl. No.: 17/534,290

(22) Filed: Nov. 23, 2021

(65) Prior Publication Data

US 2023/0163907 A1 May 25, 2023

(51) Int. Cl.
*H04B 7/06* (2006.01)
*H04L 5/00* (2006.01)
*H04L 25/02* (2006.01)

(52) U.S. Cl.
CPC ......... *H04B 7/0626* (2013.01); *H04B 7/0658* (2013.01); *H04L 5/0048* (2013.01); *H04L 25/022* (2013.01); *H04L 25/0224* (2013.01); *H04L 25/0248* (2013.01)

(58) Field of Classification Search
CPC ... H04B 7/0626; H04B 7/0658; H04L 5/0048; H04L 25/022; H04L 25/0224; H04L 25/0248
See application file for complete search history.

(56) References Cited

U.S. PATENT DOCUMENTS

| 8,687,727 | B2 * | 4/2014 | Davydov | ............. | H04B 7/0413 |
| | | | | | 375/267 |
| 2011/0085610 | A1 * | 4/2011 | Zhuang | ................ | H04B 7/0626 |
| | | | | | 375/260 |
| 2011/0299626 | A1 | 12/2011 | Kim et al. | | |
| 2013/0201912 | A1 | 8/2013 | Sheng et al. | | |
| 2014/0079149 | A1 * | 3/2014 | Lee | ...................... | H04B 7/0632 |
| | | | | | 375/267 |

(Continued)

FOREIGN PATENT DOCUMENTS

| EP | 3576361 A1 | 12/2019 |
| WO | WO2021019521 A1 | 2/2021 |

OTHER PUBLICATIONS

International Search Report and Written Opinion—PCT/US2022/078360—ISA/EPO—Jan. 19, 2023.

*Primary Examiner* — Redentor Pasia
(74) *Attorney, Agent, or Firm* — Holland & Hart LLP

(57) ABSTRACT
Methods, systems, and devices for wireless communications are described. For example, a user equipment (UE) may receive one or more reference signals from a base station. In some examples, the UE may receive the one or more reference signals over a channel for communications between the UE and the base station. The UE may measure a response of the channel based on the one or more reference signals received over the channel. In some examples, the UE may transmit a message indicating a set of channel coefficients. The set of channel coefficients may correspond to a two-dimensional (2D) model representative of the response. In some examples, the 2D model may include a spatial model and a time domain response of the channel.

82 Claims, 20 Drawing Sheets

(56) References Cited

U.S. PATENT DOCUMENTS

| | | | |
|---|---|---|---|
| 2014/0177683 A1* | 6/2014 | Krishnamurthy | H04B 7/065 |
| | | | 375/219 |
| 2015/0055555 A1 | 2/2015 | Kim et al. | |
| 2015/0305013 A1 | 10/2015 | Ji et al. | |
| 2016/0080052 A1* | 3/2016 | Li | H04B 7/0632 |
| | | | 375/267 |
| 2018/0013592 A1* | 1/2018 | Liu | H04L 25/0204 |
| 2018/0076871 A1 | 3/2018 | Rahman et al. | |
| 2020/0382168 A1* | 12/2020 | Sasaki | H04J 11/005 |
| 2021/0099210 A1* | 4/2021 | Ramireddy | H04B 7/0626 |
| 2021/0226674 A1* | 7/2021 | Ramireddy | H04B 7/0626 |
| 2022/0060232 A1* | 2/2022 | Zhu | H04B 7/0452 |
| 2022/0329297 A1* | 10/2022 | Lee | H04B 7/0626 |
| 2023/0208494 A1* | 6/2023 | Großmann | H04B 7/0634 |
| | | | 370/329 |

* cited by examiner

1310

1320

1315

1305

1300

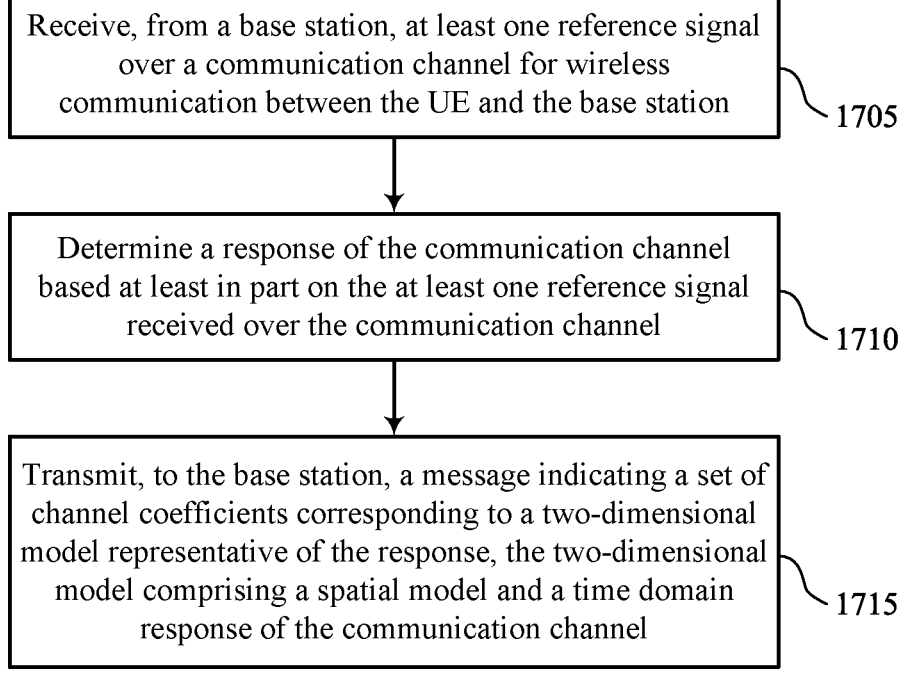

Receive, from a base station, at least one reference signal over a communication channel for wireless communication between the UE and the base station

1705

Determine a response of the communication channel based at least in part on the at least one reference signal received over the communication channel

1710

Transmit, to the base station, a message indicating a set of channel coefficients corresponding to a two-dimensional model representative of the response, the two-dimensional model comprising a spatial model and a time domain response of the communication channel

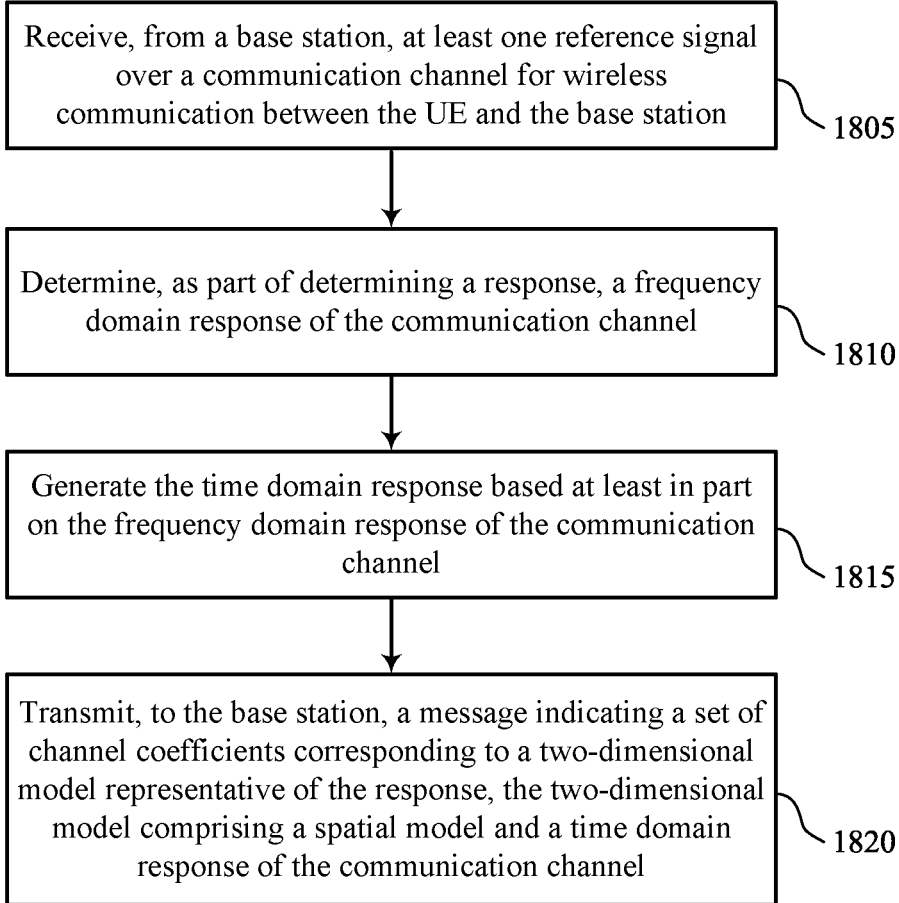

Receive, from a base station, at least one reference signal over a communication channel for wireless communication between the UE and the base station
1805

Determine, as part of determining a response, a frequency domain response of the communication channel
1810

Generate the time domain response based at least in part on the frequency domain response of the communication channel
1815

Transmit, to the base station, a message indicating a set of channel coefficients corresponding to a two-dimensional model representative of the response, the two-dimensional model comprising a spatial model and a time domain response of the communication channel
1820

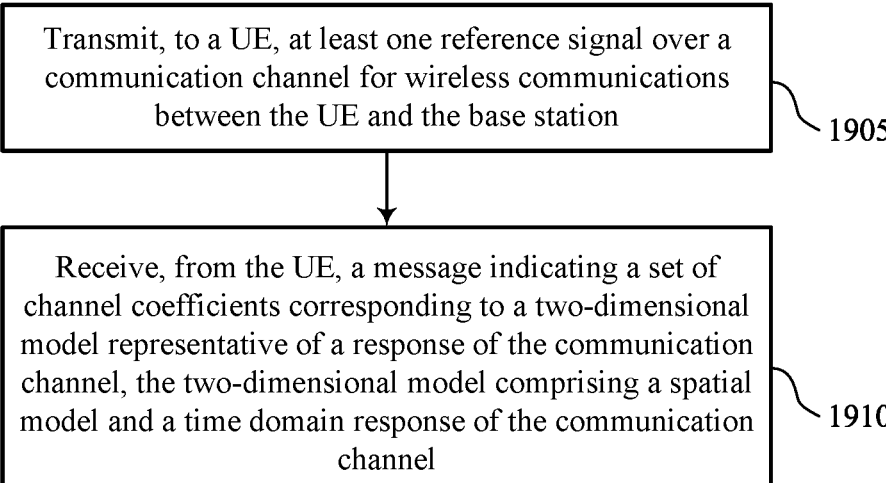

Transmit, to a UE, at least one reference signal over a communication channel for wireless communications between the UE and the base station

1905

Receive, from the UE, a message indicating a set of channel coefficients corresponding to a two-dimensional model representative of a response of the communication channel, the two-dimensional model comprising a spatial model and a time domain response of the communication channel

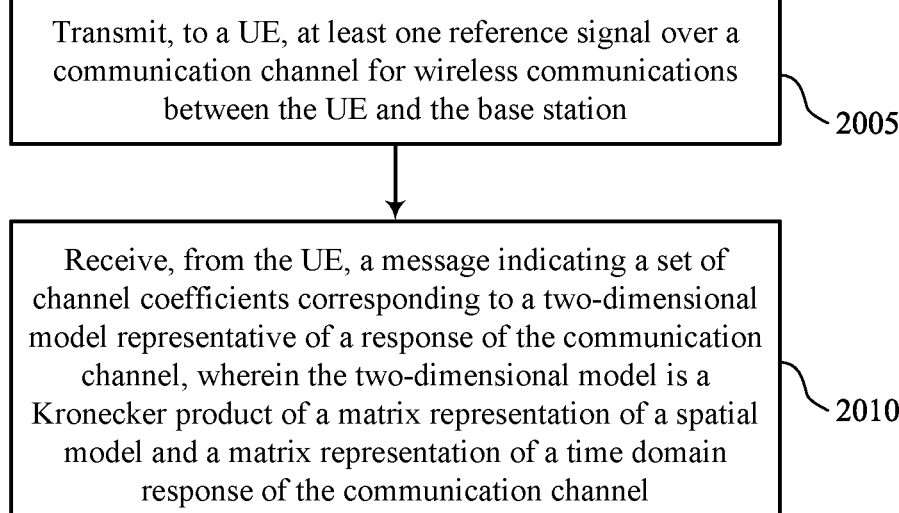

Transmit, to a UE, at least one reference signal over a communication channel for wireless communications between the UE and the base station

2005

Receive, from the UE, a message indicating a set of channel coefficients corresponding to a two-dimensional model representative of a response of the communication channel, wherein the two-dimensional model is a Kronecker product of a matrix representation of a spatial model and a matrix representation of a time domain response of the communication channel

CHANNEL COMPRESSION FOR CHANNEL FEEDBACK REPORTING

FIELD OF TECHNOLOGY

The following relates to for wireless communications, including channel compression for channel feedback reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some multiple-access communications systems, a UE may perform channel estimation and report parameters associated with the estimated channel to a base station. The base station may use the reported parameters to improve the capacity of the channel through adaptive techniques, such as channel precoding, interference mitigation, and signal rank determination. However, parameters associated with the estimated channel may not capture all properties of the channel and, as such, the channel knowledge acquired by the base station may be deficient.

SUMMARY

The described techniques relate to improved methods, systems, devices, and apparatuses that support channel compression for channel feedback reporting. Generally, a device (e.g., a user equipment (UE)) may receive one or more reference signals from a base station. In some examples, the UE may receive the one or more reference signals over a channel for communications between the UE and the base station. The UE may measure a response of the channel based on the one or more reference signals received over the channel. In some examples, the UE may transmit a message indicating a set of channel coefficients. The set of channel coefficients may correspond to a two-dimensional (2D) model representative of the response. In some examples, the 2D model may include a spatial model and a time domain response of the channel.

A method for wireless communication at a user equipment (UE) is described. The method may include receiving, from a base station, at least one reference signal over a communication channel for wireless communication between the UE and the base station, determining a response of the communication channel based on the at least one reference signal received over the communication channel, and transmitting, to the base station, a message indicating a set of channel coefficients corresponding to a two-dimensional model representative of the response, the two-dimensional model including a spatial model and a time domain response of the communication channel.

An apparatus for wireless communication at a UE is described. The apparatus may include a processor, memory coupled with the processor, and instructions stored in the memory. The instructions may be executable by the processor to cause the apparatus to receive, from a base station, at least one reference signal over a communication channel for wireless communication between the UE and the base station, determine a response of the communication channel based on the at least one reference signal received over the communication channel, and transmit, to the base station, a message indicating a set of channel coefficients corresponding to a two-dimensional model representative of the response, the two-dimensional model including a spatial model and a time domain response of the communication channel.

Another apparatus for wireless communication at a UE is described. The apparatus may include means for receiving, from a base station, at least one reference signal over a communication channel for wireless communication between the UE and the base station, means for determining a response of the communication channel based on the at least one reference signal received over the communication channel, and means for transmitting, to the base station, a message indicating a set of channel coefficients corresponding to a two-dimensional model representative of the response, the two-dimensional model including a spatial model and a time domain response of the communication channel.

A non-transitory computer-readable medium storing code for wireless communication at a UE is described. The code may include instructions executable by a processor to receive, from a base station, at least one reference signal over a communication channel for wireless communication between the UE and the base station, determine a response of the communication channel based on the at least one reference signal received over the communication channel, and transmit, to the base station, a message indicating a set of channel coefficients corresponding to a two-dimensional model representative of the response, the two-dimensional model including a spatial model and a time domain response of the communication channel.

Some examples of the method, apparatuses, and non-transitory computer-readable medium described herein may further include operations, features, means, or instructions for determining, as part of determining the response, a frequency domain response of the communication channel and generating the time domain response based on the frequency domain response of the communication channel.

Some examples of the method, apparatuses, and non-transitory computer-readable medium described herein may further include operations, features, means, or instructions for generating the spatial model based on the time domain response or the frequency domain response of the communication channel.

In some examples of the method, apparatuses, and non-transitory computer-readable medium described herein, the two-dimensional model may be a Kronecker product of a matrix representation of the spatial model and a matrix representation of the time domain response of the communication channel.

Some examples of the method, apparatuses, and non-transitory computer-readable medium described herein may further include operations, features, means, or instructions for generating the set of channel coefficients based on a minimum mean square error solution between the determined response and the two-dimensional model.

In some examples of the method, apparatuses, and non-transitory computer-readable medium described herein, the set of channel coefficients include a set of quantized coefficients.

Some examples of the method, apparatuses, and non-transitory computer-readable medium described herein may further include operations, features, means, or instructions for generating the two-dimensional model based on one or more antennas at the UE, one or more antennas at the base station, or both.

In some examples of the method, apparatuses, and non-transitory computer-readable medium described herein, transmitting the message may include operations, features, means, or instructions for transmitting, to the base station, a set of bits indicating the set of channel coefficients via a control channel or a shared channel.

Some examples of the method, apparatuses, and non-transitory computer-readable medium described herein may further include operations, features, means, or instructions for transmitting, to the base station, an indication of a number of quantized bits for the message based on a mean squared error or a signal to noise ratio of the communication channel.

Some examples of the method, apparatuses, and non-transitory computer-readable medium described herein may further include operations, features, means, or instructions for transmitting the set of channel coefficients in a first slot and transmitting a set of differential channel coefficients in a second slot after the first slot, where each differential channel coefficient of the set of differential channel coefficients include a channel coefficient difference relative to a respective channel coefficient of the set of channel coefficients.

Some examples of the method, apparatuses, and non-transitory computer-readable medium described herein may further include operations, features, means, or instructions for transmitting a second set of channel coefficients in a third slot after the first slot, the second set of channel coefficients different from the set of channel coefficients, where the set of channel coefficients and the second set of channel coefficients may be transmitted according to a first periodicity.

Some examples of the method, apparatuses, and non-transitory computer-readable medium described herein may further include operations, features, means, or instructions for transmitting a second set of differential channel coefficients in a fourth slot after the second slot, where each differential channel coefficient of the second set of differential channel coefficients includes a channel coefficient difference relative to a respective channel coefficient of the set of channel coefficients or a respective differential channel coefficient of the set of differential channel coefficients, where the set of differential channel coefficients and the second set of differential channel coefficients may be transmitted according to a second periodicity different from the first periodicity.

Some examples of the method, apparatuses, and non-transitory computer-readable medium described herein may further include operations, features, means, or instructions for receiving, from the base station, an indication instructing the UE to enable transmission of the set of differential channel coefficients, where transmitting the set of differential channel coefficients may be based on receiving the indication.

Some examples of the method, apparatuses, and non-transitory computer-readable medium described herein may further include operations, features, means, or instructions for receiving, from the base station, an indication instructing the UE to use a differential encoding procedure based on a mobility of the UE or a time interval between the message indicating the set of channel coefficients and a previous message indicating a previous set of channel coefficients.

Some examples of the method, apparatuses, and non-transitory computer-readable medium described herein may further include operations, features, means, or instructions for receiving, from the base station, an indication of an ordering of a set of spatial domain basis functions and generating the spatial model based on the ordering of the set of spatial domain basis functions.

In some examples of the method, apparatuses, and non-transitory computer-readable medium described herein, the indication includes a configuration for the spatial model that includes a list of spatial domain basis functions and the list of spatial domain basis functions corresponds to the ordering of the set of spatial domain basis functions.

Some examples of the method, apparatuses, and non-transitory computer-readable medium described herein may further include operations, features, means, or instructions for receiving, from the base station, an indication of an ordering of a set of time domain basis functions and generating the time domain response based on the ordering of the set of time domain basis functions.

Some examples of the method, apparatuses, and non-transitory computer-readable medium described herein may further include operations, features, means, or instructions for transmitting an indication of an ordering of a set of spatial domain basis functions, an ordering of a set of time domain basis functions, or both.

Some examples of the method, apparatuses, and non-transitory computer-readable medium described herein may further include operations, features, means, or instructions for determining, as part of determining the response, the time domain response of the communication channel at a set of multiple timings for each of a set of multiple antenna port pairs, selecting a set of time domain basis functions based on determining the time domain response of the communication channel at the set of multiple timings, and generating the time domain response based on the selected set of time domain basis functions.

Some examples of the method, apparatuses, and non-transitory computer-readable medium described herein may further include operations, features, means, or instructions for determining a cumulative energy of the time domain response over the set of multiple antenna port pairs for each timing of the set of multiple timings and selecting a set of timings from the set of multiple timings based on determining the cumulative energy of the time domain response for each timing of the set of multiple timings, where selecting the set of time domain basis functions may be based on the selected set of timings.

Some examples of the method, apparatuses, and non-transitory computer-readable medium described herein may further include operations, features, means, or instructions for evaluating a mean squared error of the determined response and a channel estimation using the selected set of timings, where selecting the set of time domain basis functions may be based on evaluating the mean squared error.

Some examples of the method, apparatuses, and non-transitory computer-readable medium described herein may further include operations, features, means, or instructions for receiving, from the base station, an indication of a number of timings, where selecting the set of time domain basis functions may be based on the indicated number of timings.

Some examples of the method, apparatuses, and non-transitory computer-readable medium described herein may further include operations, features, means, or instructions for transmitting, to the base station, an indication of a number of timings of the set of multiple timings.

Some examples of the method, apparatuses, and non-transitory computer-readable medium described herein may further include operations, features, means, or instructions for receiving, from the base station, an indication of a set of antenna port pairs, determining, as part of determining the response, a correlation between each antenna port pair of the set of antenna port pairs, where each antenna port pair may be associated with the UE or the base station, selecting a set of spatial domain basis functions based on determining the correlation between each antenna port pair of the set of antenna port pairs, and generating the spatial model based on the selected set of spatial domain basis functions.

Some examples of the method, apparatuses, and non-transitory computer-readable medium described herein may further include operations, features, means, or instructions for selecting the set of spatial domain basis functions based on a lowest determined correlation for an antenna port pair of the set of antenna port pairs.

Some examples of the method, apparatuses, and non-transitory computer-readable medium described herein may further include operations, features, means, or instructions for evaluating a spatial autocorrelation matrix based on determining the correlation between each antenna port pair of the set of antenna port pairs, where selecting the set of spatial domain basis functions may be based on the spatial autocorrelation matrix.

A method for wireless communications at a base station is described. The method may include transmitting, to a UE, at least one reference signal over a communication channel for wireless communications between the UE and the base station and receiving, from the UE, a message indicating a set of channel coefficients corresponding to a two-dimensional model representative of a response of the communication channel, the two-dimensional model including a spatial model and a time domain response of the communication channel.

An apparatus for wireless communications at a base station is described. The apparatus may include a processor, memory coupled with the processor, and instructions stored in the memory. The instructions may be executable by the processor to cause the apparatus to transmit, to a UE, at least one reference signal over a communication channel for wireless communications between the UE and the base station and receive, from the UE, a message indicating a set of channel coefficients corresponding to a two-dimensional model representative of a response of the communication channel, the two-dimensional model including a spatial model and a time domain response of the communication channel.

Another apparatus for wireless communications at a base station is described. The apparatus may include means for transmitting, to a UE, at least one reference signal over a communication channel for wireless communications between the UE and the base station and means for receiving, from the UE, a message indicating a set of channel coefficients corresponding to a two-dimensional model representative of a response of the communication channel, the two-dimensional model including a spatial model and a time domain response of the communication channel.

A non-transitory computer-readable medium storing code for wireless communications at a base station is described. The code may include instructions executable by a processor to transmit, to a UE, at least one reference signal over a communication channel for wireless communications between the UE and the base station and receive, from the UE, a message indicating a set of channel coefficients corresponding to a two-dimensional model representative of a response of the communication channel, the two-dimensional model including a spatial model and a time domain response of the communication channel.

In some examples of the method, apparatuses, and non-transitory computer-readable medium described herein, the two-dimensional model may be a Kronecker product of a matrix representation of the spatial model and a matrix representation of the time domain response of the communication channel.

In some examples of the method, apparatuses, and non-transitory computer-readable medium described herein, the set of channel coefficients include a set of quantized coefficients.

In some examples of the method, apparatuses, and non-transitory computer-readable medium described herein, receiving the message may include operations, features, means, or instructions for receiving, from the UE, a set of bits indicating the set of channel coefficients via a control channel or a shared channel.

Some examples of the method, apparatuses, and non-transitory computer-readable medium described herein may further include operations, features, means, or instructions for receiving, from the UE, an indication of a number of quantized bits for the message based on a mean squared error or a signal to noise ratio of the communication channel.

Some examples of the method, apparatuses, and non-transitory computer-readable medium described herein may further include operations, features, means, or instructions for receiving the set of channel coefficients in a first slot and receiving a set of differential channel coefficients in a second slot after the first slot, where each differential channel coefficient of the set of differential channel coefficients include a channel coefficient difference relative to a respective channel coefficient of the set of channel coefficients.

Some examples of the method, apparatuses, and non-transitory computer-readable medium described herein may further include operations, features, means, or instructions for receiving a second set of channel coefficients in a third slot after the first slot, the second set of channel coefficients different from the set of channel coefficients, where the set of channel coefficients and the second set of channel coefficients may be received according to a first periodicity.

Some examples of the method, apparatuses, and non-transitory computer-readable medium described herein may further include operations, features, means, or instructions for receiving a second set of differential channel coefficients in a fourth slot after the second slot, where each differential channel coefficient of the second set of differential channel coefficients includes a channel coefficient difference relative to a respective channel coefficient of the set of channel coefficients or a respective differential channel coefficient of the set of differential channel coefficients, where the set of differential channel coefficients and the second set of differential channel coefficients may be transmitted according to a second periodicity different from the first periodicity.

Some examples of the method, apparatuses, and non-transitory computer-readable medium described herein may further include operations, features, means, or instructions for transmitting, to the UE, an indication instructing the UE to enable transmission of the set of differential channel coefficients, where receiving the set of differential channel coefficients may be based on transmitting the indication.

Some examples of the method, apparatuses, and non-transitory computer-readable medium described herein may further include operations, features, means, or instructions for transmitting, to the UE, an indication instructing the UE to use a differential encoding procedure based on a mobility of the UE or a time interval between the message indicating the set of channel coefficients and a previous message indicating a previous set of channel coefficients.

Some examples of the method, apparatuses, and non-transitory computer-readable medium described herein may further include operations, features, means, or instructions for transmitting, to the UE, an indication of an ordering of a set of spatial domain basis functions for the two-dimensional model.

In some examples of the method, apparatuses, and non-transitory computer-readable medium described herein, the indication includes a configuration for the spatial model that includes a list of spatial domain basis functions and the list of spatial domain basis functions corresponds to the ordering of the set of spatial domain basis functions.

Some examples of the method, apparatuses, and non-transitory computer-readable medium described herein may further include operations, features, means, or instructions for transmitting, to the UE, an indication of an ordering of a set of time domain basis functions for the two-dimensional model.

Some examples of the method, apparatuses, and non-transitory computer-readable medium described herein may further include operations, features, means, or instructions for receiving an indication of an ordering of a set of spatial domain basis functions, an ordering of a set of time domain basis functions, or both, for the two-dimensional model.

Some examples of the method, apparatuses, and non-transitory computer-readable medium described herein may further include operations, features, means, or instructions for transmitting, to the UE, an indication of a number of timings for the two-dimensional model.

Some examples of the method, apparatuses, and non-transitory computer-readable medium described herein may further include operations, features, means, or instructions for receiving, from the UE, an indication of a number of timings of a set of multiple timings for the two-dimensional model.

Some examples of the method, apparatuses, and non-transitory computer-readable medium described herein may further include operations, features, means, or instructions for transmitting, to the UE, an indication of a set of antenna port pairs, where each antenna port pair may be associated with the UE or the base station.

BRIEF DESCRIPTION OF THE DRAWINGS

FIGS. 17 through 20 show flowcharts illustrating methods that support channel compression for channel feedback reporting in accordance with aspects of the present disclosure.

DETAILED DESCRIPTION

Figure 1:
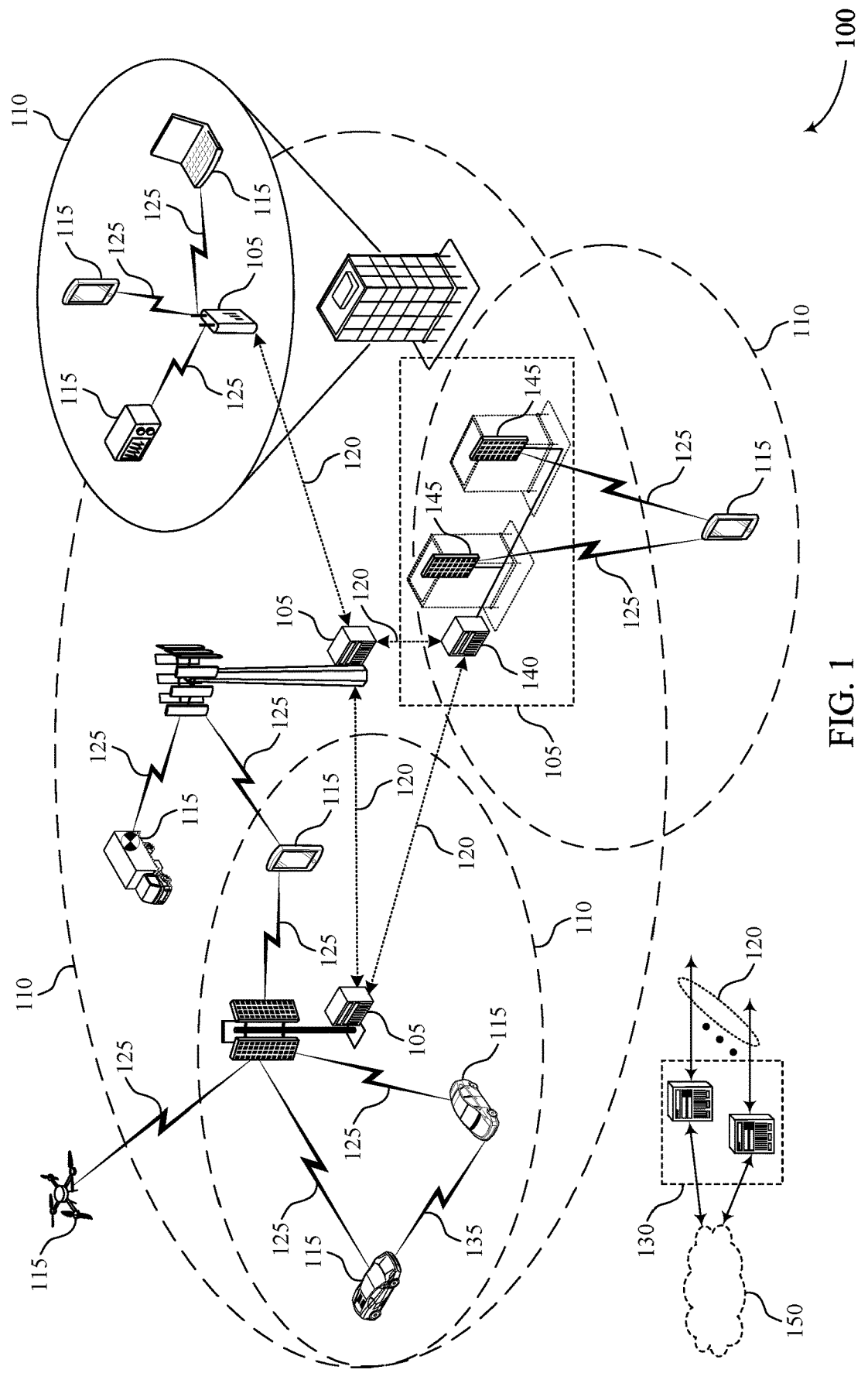
FIGS. 1 and 2 each illustrate an example of a wireless communications system that supports channel compression for channel feedback reporting in accordance with aspects of the present disclosure.

A wireless multiple-access communications system may include a number of base stations or network access nodes, each simultaneously supporting communication for multiple communication devices, which may be otherwise known as user equipments (UEs). For example, a wireless communications system may be configured to support multi-input multi-output (MIMO) at various frequency bands to enable increased throughput within the communications system. In some examples, MIMO communication may be carried out via beamforming using multiple antennas at a transmitter (e.g., a base station or a UE) and multiple antennas at a receiver (e.g., a base station or a UE). In some cases, the UE and the base station may share information regarding the quality of a communication channel to improve signal reliability and efficiency for MIMO communications. For example, a communications system may support a format for reporting channel state feedback (CSF) where a UE performs channel estimation and reports one or more parameters associated with the estimated communication channel to the base station. In some examples, the reported parameters may be referred to as channel state information (CSI)

which may include a channel quality indicator (CQI), a precoding matrix indicator (PMI), or a rank indicator (RI), among others.

In some examples, the base station may use reported CSI to maximize the capacity of the communication channel through techniques used to adapt the communication rate to the communication channel for (e.g., adaptive techniques). Such adaptive techniques may include channel precoding, multi-user MIMO (MU-MIMO) scheduling, interference mitigation, and signal rank determination, among other examples. While CSI reported to the base station may include parameters associated with the estimated communication channel (e.g., a precoding matrix, a modulation and coding scheme (MCS), or a rank), the parameters may not capture all properties of the communication channel. That is, the reported CSI may not capture the entire response of the communication channel (e.g., the channel response) and, as such, the channel knowledge acquired by the base station may be deficient. Accordingly, the efficiency of adaptive techniques performed by the base station may be reduced. Moreover, the overhead associated with CSI reporting may increase with the number of antenna ports used by the transmitting device (e.g., the base station). Therefore, CSI may not be a suitable format for reporting CSF if the base station includes a large number of antennas, for example to support massive-MIMO communications.

Various aspects of the present disclosure relate to techniques for basis function selection for efficient CSF reporting. Generally, the described techniques provide for reporting an estimated communication channel through channel compression. In some examples, a communication device may use a time-frequency model (e.g., a time domain response of the channel or a time domain impulse response of the channel) and a time-space model (e.g., a spatial model representing the time domain response of the channel across antenna ports at the transmitter and the receiver) to perform two-dimensional (2D) channel estimation and obtain a set of channel coefficients that represents the estimated communication channel. In some examples, the UE may compress the channel coefficients using quantization and entropy encoding (e.g., loss-less compression).

The UE may indicate the set of coefficients to a base station. The base station may use the set of coefficients to obtain the estimated communication channel and determine parameters for adaptive techniques, such as channel precoding, MU-MIMO scheduling, interference mitigation, and signal rank determination, among other examples. In some examples, the UE may obtain the set of channel coefficients using a joint (e.g., 2D) model expressed as a Kronecker product of a matrix representation of the spatial model and a matrix representation of the time domain response of the communication channel. In some examples, the UE may indicate a set of coefficients obtained by finding a minimum mean square error (MMSE) solution to the joint model. That is, the generation of the channel coefficient may be accomplished by the UE finding the MMSE solution between a representation of the channel response using the 2D model and the measured channel response.

In some examples, the time domain model (e.g., the time domain response of the communication channel or the time domain channel response) may include a set of time domain basis functions that each describe a time domain position of a time domain response of the channel. Additionally or alternatively, the spatial model may include one or more sets of spatial domain basis functions associated with the spatial correlation between antennas at the base station (e.g., transmitter) or the spatial correlation between antennas at the UE (e.g., receiver). That is, the spatial domain basis functions may relate to the correlation between antennas at the base station or antennas at the UE, such that selection of a set of spatial domain basis functions may include selecting one or more eigenvectors (e.g., corresponding to the highest eigen values) of an autocorrelation matrix of the antennas at the base station or the antennas at the UE. In some examples, the spatial domain basis functions may correspond to antennas at the base station or the UE. For example, one set of spatial domain basis functions may be related to the antennas at the base station and another set (e.g., a different set) of spatial domain basis functions may be related to antennas at the UE.

In some examples, the UE may exploit channel sparsity to obtain the time domain and spatial domain basis functions. For example, the UE may determine the time domain basis functions based on the energy of the time domain response of the channel at different time positions (e.g., delays or timings). In some examples, the UE may select a number of time delays (e.g., time domain basis functions) in which the energy of the time domain response is relatively high. In some other examples, the UE may iteratively evaluate different time delay combinations and select a combination of time delays for which the expected mean square error (MSE) of the estimated channel is reduced.

In some examples, the UE may determine a set of spatial domain basis functions by evaluating an autocorrelation matrix associated with pairs of antenna ports at the base station or pairs of antenna ports at the UE. For example, the UE may determine the autocorrelation matrix by measuring the correlation between one or more pairs of antenna ports (e.g., pairs of antenna ports at the UE or pairs of antenna ports at the base station) or by modeling the correlation between one or more pairs of antenna ports (e.g., at the UE or at the base station) using the 2D topology of the antenna array at the UE and the 2D topology of the antenna array at the base station. The UE may determine the spatial domain basis functions by performing a singular value decomposition (SVD) for the autocorrelation matrix and selecting the vectors (e.g., spatial domain basis functions) with relatively large values (e.g., eigenvalues). In some other examples, the UE may select the time domain basis functions and the spatial domain basis functions based on one or more indications from the base station. For example, the base station may indicate a set (e.g., in a given order) of time domain basis functions and spatial domain basis functions to the UE. The UE may select a subset of basis functions (e.g., according to the indicated ordering) for the time domain response of the channel and the spatial model, respectively. In another example, the base station may indicate a list of configurations (e.g., sets) of time domain and spatial domain basis functions. The UE may select one or more sets of basis functions from the respective lists for the time domain response and the spatial model. In some examples, the UE may transmit an indication of the selected time domain and spatial domain basis functions to the base station.

In some examples, the UE may dynamically evaluate different combinations of channel compression parameters to determine a channel compression configuration that reduces the expected error (e.g., MSE). The channel compression parameters may include the number of time domain basis functions, the time domain positions (e.g., delays used to determine the time domain basis functions), the number of spatial domain basis functions, the spatial domain basis function indices (e.g., used to determine the spatial domain basis functions), or the number of quantization bits (e.g., per channel coefficient), among other examples. Additionally or alternatively, the base station may transmit one or more parameters to the UE to assist the UE in performing the channel compression. For example, the base station may transmit one or more parameters for performing differential encoding, determining a channel compression configuration, or determining the time domain and spatial domain basis functions.

Additionally or alternatively, the UE may use differential encoding to increase the accuracy in which the set of coefficients represents the estimated channel (e.g., to further enhance the tradeoff between accuracy and overhead). In some examples, using differential encoding may increase the efficiency for transmitting messages of a reduced size to indicate changes (e.g., relatively small changes) in the channel as compared to reporting a complete set or sets of coefficients that represent the estimated channel when channel estimations change. For example, the UE may use differential encoding to determine the change in the value of the quantized channel coefficients between a first time slot and one or more other time slots that may occur after the first time slot. In some examples, the one or more other time slots (e.g., P-slots) may be measured relative to an anchor (I-slot) and, in some other examples, the other or more other time slots (P-slots) may each be measured relative to a preceding time slot (e.g., P-1). For instance, the first time slot may occur at an anchor slot (e.g., I) or a preceding time slot (e.g., P-1). The UE may encode the set of differential channel coefficients for transmitting to the base station. In some cases, the set of differential channel coefficients may be transmitted to the base station at a periodicity that is lower than the periodicity in which UE transmits the set of channel coefficients.

In some examples, indicating a set of channel coefficients (e.g., or set of differential channel coefficients) which represents the estimated channel may increase the channel knowledge acquired by the base station and, as such, increase the efficiency of adaptive techniques performed by the base station. For example, the 2D model as described herein may be used to compress the channel response across different antennas at a transmitter (e.g., a base station) or a receiver (e.g., a UE). The compression may exploit the long-term spatial correlation (e.g., the correlation between antennas at the base station or the UE) as well as the sparsity nature of the channel in the time domain. Traditional techniques, such as those related to PMI, may refer to a precoding matrix to be applied by the transmitter rather than a channel response. Further, PMI may include or refer to coefficients per antenna port and, as such, may not represent the channel response or a compressed channel response. The 2D model described herein is representative of the channel response (e.g., a compressed channel response) and may take into consideration long-term statistics such as historical information or previous channel response information. PMI, on the other hand, does not take into consideration any long-term statistics.

Particular aspects of the subject matter described herein may be implemented to realize one or more of the following potential advantages. The techniques employed by the described communication devices may provide benefits and enhancements to the operation of the communication devices, including increasing the efficiency of adaptive techniques performed by the communications device. For example, the described techniques may support improvements in wireless communications systems and the reliability of communications by increasing channel knowledge acquired by communications devices. Further, channel compression for channel feedback reporting, as described herein, may reduce overhead, thereby improving latency and reliability. As such, the described techniques may result in improved network operations and network work efficiencies, among other benefits.

Aspects of the disclosure are initially described in the context of wireless communications systems. Aspects of the disclosure are then described in the context of a channel compression procedure, performance response diagrams, differential encoding schemes, and a process flow. Aspects of the disclosure are further illustrated by and described with reference to apparatus diagrams, system diagrams, and flowcharts that relate to channel compression for channel feedback reporting.

FIG. 1 illustrates an example of a wireless communications system 100 that supports channel compression for channel feedback reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and MU-MIMO, where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via plural antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI- RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal to noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may report an estimated communication channel through channel coefficient compression. For example, the UE 115 may use a time domain response and a spatial model to perform 2D channel estimation and generate a set of channel coefficients that represents the estimated channel. The set of channel coefficients may be quantized and encoded for transmission to a base station 105. In some examples, the time domain response may be generated using time domain basis functions that represent the time delay of the channel. The UE 115 may select a set of time domain basis functions based on the energy of the time domain response of the channel at different time delays. Additionally or alternatively, the spatial model may be based on spatial domain basis functions.

The UE 115 may select a set of spatial domain basis functions based on the measured correlation between one or more pairs of antenna ports (e.g., pairs of antennas at the UE 115 or pairs of antennas at the base station 105) or modeling the correlation between one or more pairs of antenna ports (e.g., at the UE 115 or the base station 105) using the 2D topology of the antenna array at the UE 115 and the 2D topology of the antenna array at the base station 105.

In some examples, the UE 115 may dynamically evaluate different combinations of channel coefficient compression, such as the number of basis functions or number of quantized bits used per channel coefficient, to determine a channel compression configuration that reduces the expected error. In some cases, the UE 115 may transmit an indication of one or more channel compression parameters to the base station. Additionally or alternatively, the base station 105 may indicate one or more channel compression parameters to the UE 115 to assist the UE 115 in generating the set of channel coefficients. Additionally or alternatively, to increase the accuracy in which the set of coefficients represents the estimated channel, the UE 115 may use differential encoding to determine the change in the value of the quantized channel coefficients between different time slots. In some examples, indicating channel coefficients which represent the estimated channel (e.g., rather than parameters associated with the estimated channel) may increase the channel knowledge acquired by the base station and, as such, increase the efficiency of adaptive techniques performed by the base station to increase the capacity of the channel.

Figure 2:
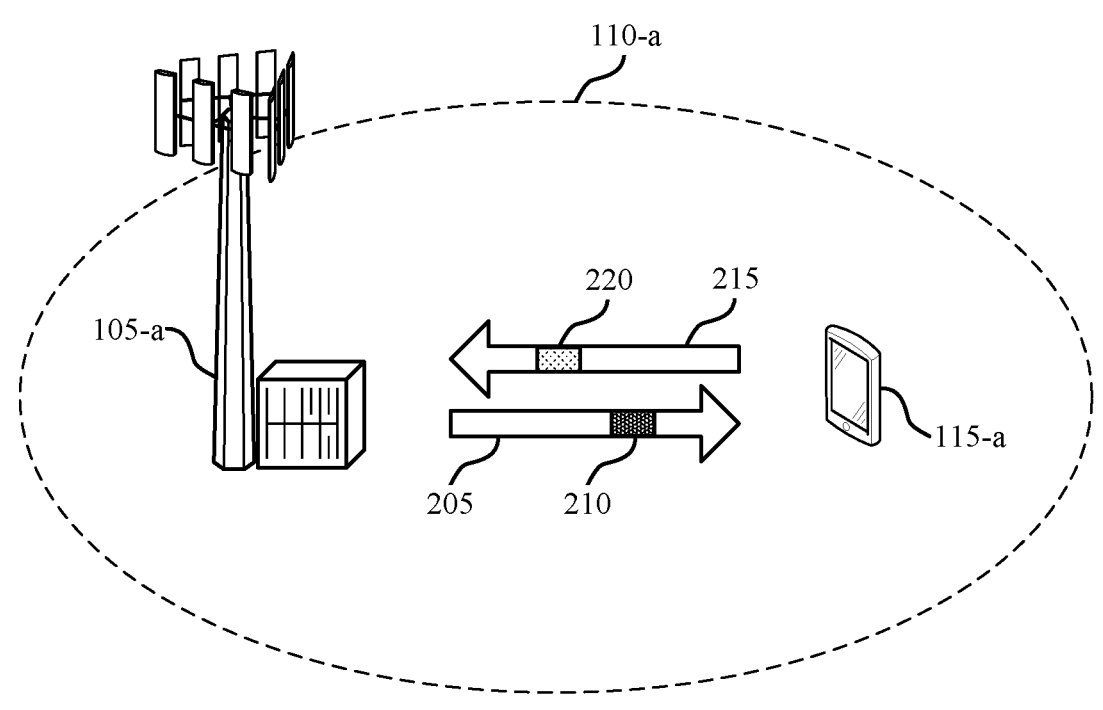
Figure 2:
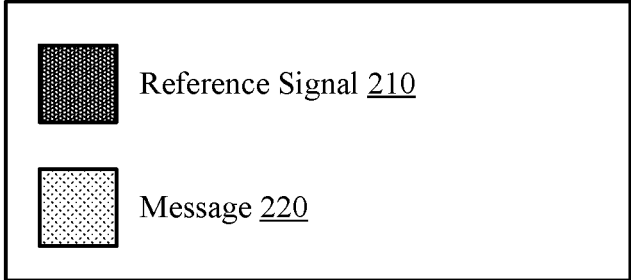

FIG. 2 illustrates an example of a wireless communications system 200 that supports channel compression for channel feedback reporting in accordance with aspects of the present disclosure. In some examples, the wireless communications system 200 may implement aspects of the wireless communications system 100. For example, the wireless communications system 200 may include a base station 105-*a* and a UE 115-*a* which may be examples of the corresponding devices described with reference to FIG. 1. The base station 105-*a* and the UE 115-*a* may communicate within a geographic coverage area 110-*a* which may be an example of a geographic coverage area 110 described with reference to FIG. 1. In some examples, the UE 115-*a* may communicate with the base station 105-*a* via a communication link 205 and a communication link 215. In the example of FIG. 2, the communication link 205 may be a downlink and the communication link 215 may be an uplink.

In some examples, a transmitting device (e.g., a base station 105-*a*) may obtain channel knowledge (e.g., knowledge of the communication channel) from a receiving device (e.g., a UE 115-*a*) that may enable channel adaptive techniques at the transmitting device (e.g., the base station 105-*a*). For example, a response of a communication channel (e.g., a channel response) may refer to an impulse response function of the communication channel. That is, the channel may be characterized by a channel transfer function or a time domain Fourier transform of the impulse response function of the communication channel. For example, signals transmitted from a communication device may experience multipath propagation, such that the transmitted signals may reach a receiving communication device by multiple (e.g., more than two) paths. Multipath propagation may result from atmospheric ducting, refraction, or reflection off of objects in the surrounding area. In some examples, multipath propagation may result in interference and phase shifting of the transmitted signals (e.g., multipath interference or multipath distortion), which may affect the signals prior to detection at a receiving communication device. That is, a signal at the time it is received may be altered relative to the signal at the time it is transmitted.

In some examples, the received signal (e.g., the signal which experienced multipath propagation through the communication channel) may be described by the impulse response function of the communication channel. The impulse response function may refer to a reaction (e.g., output) of a system in response to an external change (e.g., input). As such, the impulse response function may account for different impulses of the transmitted signal (e.g., brief input signals) arriving at the receiver at different times (e.g., due to experiencing different paths). That is, the impulse response function of the communication channel may describe the behavior of the system (e.g., the communication channel) as a function of time. Thus, knowledge of the impulse response function of the communication channel (e.g., the response of the communication channel or channel response) may aid channel adaptive techniques at the transmitting device.

In some examples, channel adaptive techniques may be used by the base station 105-*a* to increase the capacity of the channel. For example, channel adaptive techniques may be used by a transmitter aiming to maximize the system capacity, such as channel precoding, MU-MIMO scheduling, interference mitigation, and the like. The base station 105-*a* may, in some examples, obtain channel knowledge via CSF reporting, where the UE 115-*a* performs channel estimation and reports one or more parameters associated with the estimated channel (e.g., CSI parameters) to the base station 105-*a*.

In some examples, however, techniques for reporting channel knowledge to the base station 105-*a* may be deficient. For example, reporting the channel status (e.g., CSI parameters) using the uplink control channel (e.g., such as the physical uplink control channel (PUCCH)) may be inefficient in terms of overhead and accuracy. In some examples, inefficiencies related to overhead and accuracy may increase (e.g., may be more prominent) with an increase in the number of antennas ports at the base station 105-*a* (e.g., for massive-MIMO communications). For example, if the number of antenna ports used for transmissions at the base station 105-*a* increases, the information transmitted over a given channel may increase (i.e., the communication channel may become richer) and, accordingly, the overhead used for CSF reporting of the channel may also increase. Therefore, techniques (e.g., solutions) for reporting CSI parameters may be unsuitable for capturing additional or all channel properties and may therefore be a limited or inaccurate representation of the channel. Further, techniques for reporting CSI parameters may be less suited for massive-MIMO communications, for example if reported CSI scales with the number of ports (e.g., antenna ports) at the transmitter, and may therefore reduce the system performance through increased latency, inefficient use of network resources, etc.

In some other examples, rather than reporting CSI parameters associated with the estimated channel, the UE 115-*a* may report the estimated channel itself through channel compression. For example, the UE 115-*a* may utilize techniques for efficient channel representation to balance the overhead used to report channel knowledge with the accuracy at which the channel is represented. In some examples, an efficient (e.g., compressed) channel representation may be used as a CSF format to achieve a desirable overhead-accuracy tradeoff, as well as enable a mechanism for adjusting the overhead-accuracy tradeoff, for example using one or more parameters. In other words, a compressed representation of the channel response may be used as the base for CSF reporting, for example in terms of the overhead-accuracy tradeoff and enabling a mechanism to adjust such a tradeoff according to the system parameters. In some cases, a compressed representation of the channel response may be achieved using a 2D decomposition (e.g., model) of the channel response. In some examples, using such a representation of the channel response may improve CSF reporting efficiency and enable channel adaptive techniques at the transmitting device (e.g., the base station 105-*a*), which may use more accurate channel knowledge, to increase the system capacity of a channel.

As an illustrative example, the UE 115-*a* may receive one or more reference signals (e.g., a reference signal 210) from the base station 105-*a* via the communication link 205. In some examples, the reference signal 210 may be transmitted over a channel for communications between the UE 115-*a* and the base station 105-*a*. The UE 115-*a* may measure a channel response of the channel based on the reference signal 210. In some examples, as part of measuring the channel response, the UE 115-*a* may measure a frequency domain response of the channel and generate a time domain response of the channel. The time domain response of the channel may be evaluated from the frequency domain response of the channel. Additionally or alternatively, the UE 115-*a* may generate a spatial model based on the time domain response of the channel or the frequency domain response of the channel. For example, the spatial model may be generated by evaluating the spatial behavior of the time domain response of the channel or the frequency domain channel response. That is, the UE 115-*a* may calculate the correlation between time domain response (e.g., or the frequency domain response) of the channel from different antennas at the base station 105-*a* and, based on the calculated correlation, determine the spatial model (e.g., the set of spatial domain basis functions). In some examples, the UE 115-*a* may transmit, to the base station 105-*a*, a message 220 via the communication link 215. In some examples, the message 220 may indicate a set of channel coefficients corresponding to a 2D model representative of the channel response. In some examples, the 2D model may include the time domain response of the channel and the spatial model.

Figure 3:
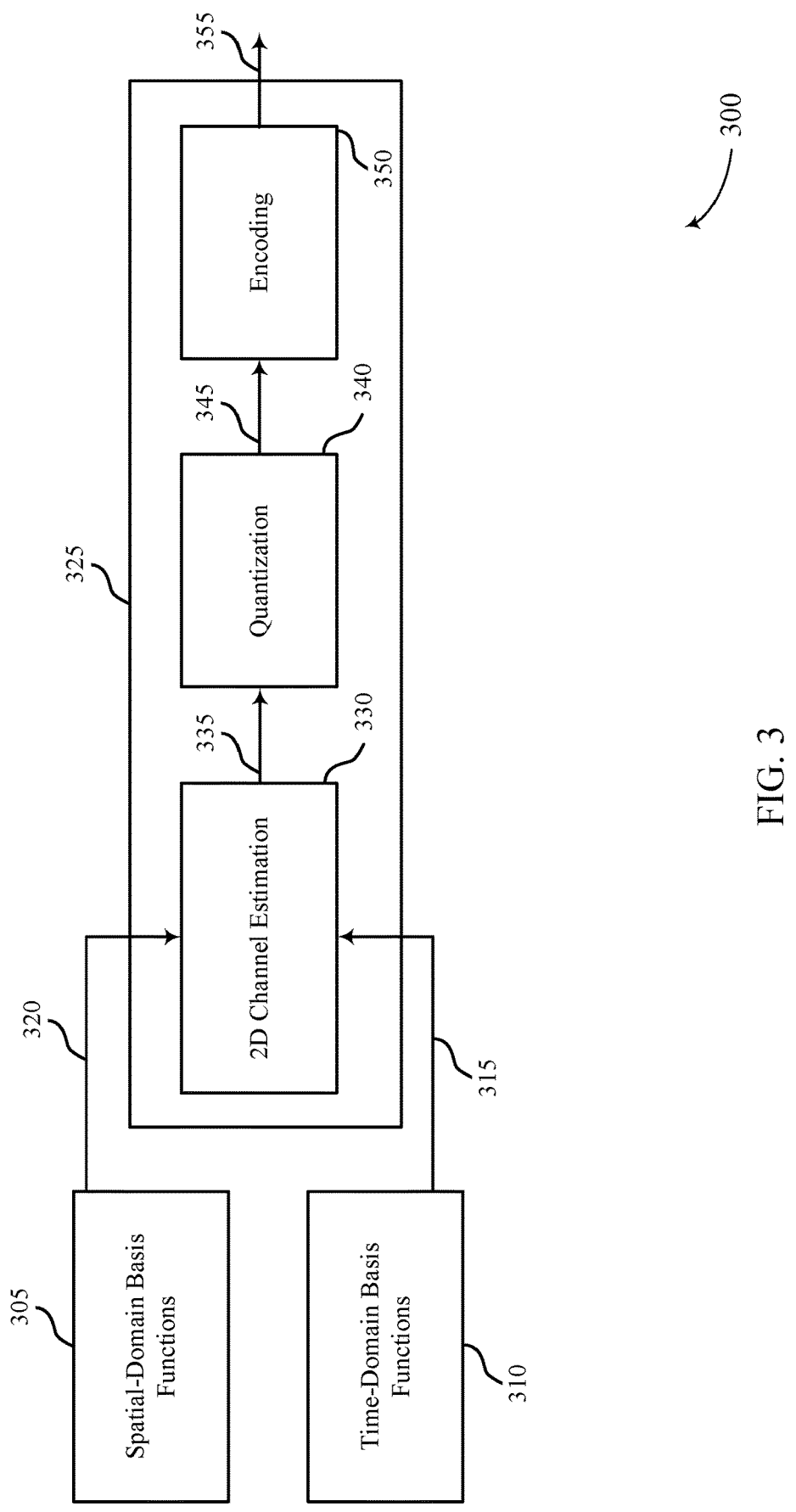
FIG. 3 illustrates an example of a channel compression procedure that supports channel compression for channel feedback reporting in accordance with aspects of the present disclosure.

FIG. 3 illustrates an example of a channel compression procedure 300 that supports channel compression for channel feedback reporting in accordance with aspects of the present disclosure. In some examples, the channel compression procedure 300 may include aspects of the wireless communications systems 100 and 200 described with respect to FIGS. 1 and 2, respectively. For example, the channel compression procedure 300 may be implemented by a UE 115 which may be an example of the correspond device described with reference to FIGS. 1 and 2.

In some examples, a compact representation of the channel response may exploit the sparse nature (e.g., sparsity) of the communication channel in the spatial domain and the time domain. For example, in the spatial domain, the correlation between antenna ports at the transmitting device (e.g., the base station) or the correlation between antenna ports at the receiving device (e.g., the UE) may enable accurate representation of the channel while using one or more eigenvectors (e.g., few eigenvectors compared to the number of antenna ports) of the autocorrelation matrix. In some examples, the spatial domain basis functions may be eigenvectors of the autocorrelation matrix. In other words, antennas at the base station and UE may be correlated such that a channel experienced by a first antenna may be correlated with the channel experienced by a second antenna located near the first antenna. As such, antennas which are co-located, may be correlated and the correlation of such antennas may be exploited for channel compression. Additionally or alternatively, a channel between one transmitting antenna (e.g., an antenna at the base station) and a receiving antenna (e.g., an antenna at the UE) may also be sparse in the time domain. In some examples, the sparsity of the channel in the time domain (e.g., the sparsity of time domain taps) may enable accurate representation of the channel response using one or more time domain taps (e.g., time delays). In some examples, the time-delays may be used as time domain basis functions for the time-frequency model (e.g., the time domain response of the channel).

For example, as illustrated by FIG. 3, spatial domain basis functions 305 and time domain basis functions 310 may be combined (e.g., at 320 and 315 respectively) to generate a 2D (e.g., time and space) model representative of the channel response (e.g., the compact representation of the channel response). In some examples, the 2D model may be used in channel compression 325, which may include 2D channel estimation 330, quantization 340, and encoding 350. For example, the 2D channel estimation 330 may be used to obtain a set of channel coefficients corresponding to the 2D model. Additionally or alternatively, quantization 340 and encoding 350 (e.g., entropy encoding) of the channel coefficients may enable further compression of the information reported to the base station (e.g., the payload). For example, the channel coefficients may be further compressed using quantization 340 and encoding 350 (e.g., at 335 and 345, respectively) and transmitted to a base station at 355.

Figure 4A:
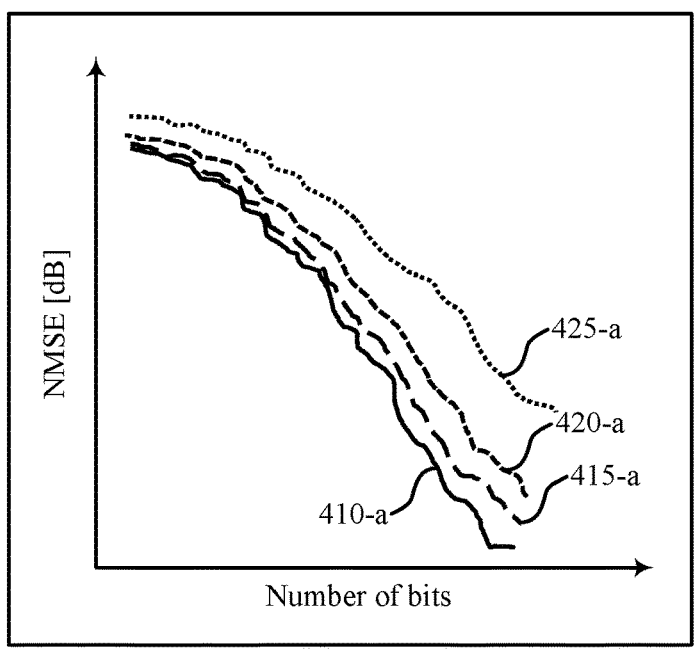
FIGS. 4A and 4B each illustrate an example of a performance response diagram that supports channel compression for channel feedback reporting in accordance with aspects of the present disclosure.
Figure 4B:
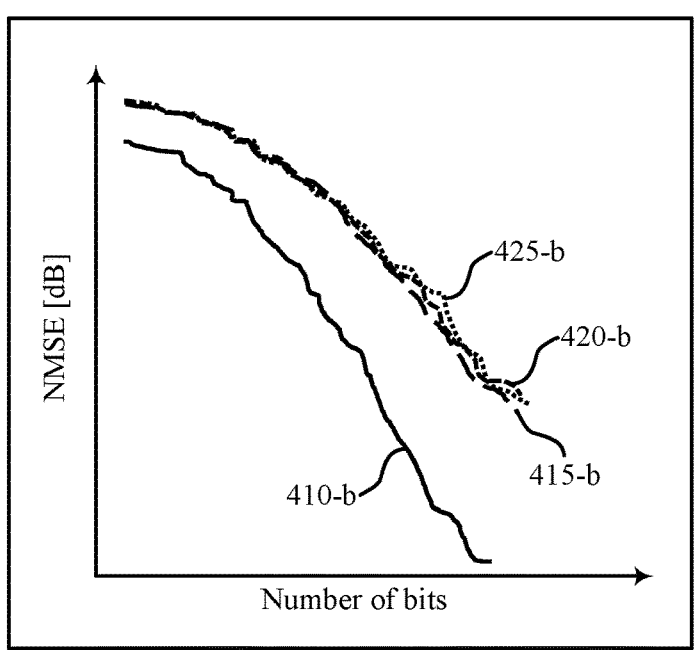

FIGS. 4A and 4B each illustrate an example of a performance response diagram 400 that supports channel compression for channel feedback reporting in accordance with aspects of the present disclosure. In some examples, the performance response diagrams 400 (e.g., a performance response diagram 400-*a* and a performance response diagram 400-*b*) may implement or be implemented by aspects of wireless communications systems 100 and 200. For example, the performance response diagrams 400 may be associated with communications between a base station and a UE, which may be examples of corresponding devices described with reference to FIGS. 1 and 2.

As illustrated in the example of FIG. 4A, the accuracy at which the channel estimation report (e.g., a set of channel coefficients indicated to a base station) represents the estimated channel may depend on the number of bits used to represent the estimated channel (e.g., the average number of bits per coefficient). For example, the performance response diagram 400-*a* illustrates the normalized mean square error (NMSE) of the compressed channel (e.g., the error between the compressed channel response and the measured channel response) plotted as a function of bits, where each performance response (e.g., curve) may represent a different technique for generating a set of spatial domain basis functions. In other words, the performance response diagram 400-*a* illustrates the performance of different tradeoffs, for example between signaling overhead in bits and the accuracy of the channel estimation report. In the example of FIG. 4A, the performance illustrated in the performance response diagram 400-*a* may be based on a 20 MHz channel bandwidth, 32 antennas ports at the transmitter (e.g., the base station), 1 antenna port at the receiver (e.g., the UE), and a UE velocity of 3 kilometers per hour (kmph). However, different tradeoffs may be achieved using a different number of time domain basis functions, a different number of spatial domain basis function, or a different number of quantized bits (e.g., bits for quantization).

In some examples, a performance response (e.g., a performance response 425-$a$, a performance response 420-$a$, a performance response 415-$a$, and a performance response 410-$a$) may indicate that the NMSE of the compressed channel response (e.g., obtained from a MMSE solution of the 2D model), decreases as the number of bit used to represent the channel (e.g., the average number of bits used per coefficient) increases. In some examples, the performance response 425-$a$ may be achieved if the set of spatial domain basis functions is predefined (e.g., fixed), the performance response 420-$a$ may be achieved if the set of basis functions are updated (e.g., calculated using SVD) every 60 slots, the performance response 415-$a$ may be achieved if the spatial domain basis functions are updated (e.g., calculated using SVD) every 20 slots, and the performance response 410-$a$ may be achieved if the set of basis functions are updated instantaneously (e.g., the performance response 410-$a$ may correspond to a reference for the performance response 415-$a$, the performance response 420-$a$, and the performance response 425-$a$). In some examples, the performance response diagram 400-$a$ may illustrate improvement (e.g., with respect to both signaling overhead and the accuracy of the channel response) achieved by the channel compression techniques described herein, for example compared to CSF mechanisms which rely on CSI parameters. In some cases, the channel compression techniques described herein may have a relatively low complexity on both the transmitter side (e.g., at the base station) and the receiver side (e.g., at the UE). Additionally or alternatively, the utilized memory may also be relatively small, for example due to a reduced number (e.g., less than 16) of basis functions in the spatial domain or time domain (e.g., impulse response domain).

In some examples, the velocity of the receiving device (e.g., the UE) may impact how the accuracy of the set of channel coefficients depends on the spatial domain basis functions used to generate the set of channel coefficients. For example, the performance illustrated in the performance response diagram 400-$b$ may be based on a 20 MHz channel bandwidth, 32 antennas ports at the transmitter (e.g., the base station), 1 antenna port at the receiver (e.g., the UE), and a UE velocity of 120 kmph. In some examples, the performance response 425-$b$ may be achieved if the set of spatial domain basis functions is predefined (e.g., fixed), the performance response 420-$b$ may be achieved if the set of basis functions is updated every 60 slots, the performance response 415-$b$ may be achieved if the set of basis functions is updated every 20 slots, and the performance response 410-$b$ may be achieved if the set of basis functions is updated instantaneously. In some cases, a performance response (e.g., a performance response 425-$b$, a performance response 420-$b$, and a performance response 415-$b$) of a set of channel coefficients may depend less on the set of spatial domain basis functions (e.g., the rate at which the spatial domain basis functions may be updated), for example compared to a performance responses (e.g., a performance response 425-$a$, a performance response 420-$a$, and a performance response 415-$a$) illustrated in the example of FIG. 4A, which may be based on a UE velocity of 3 kmph.

In some examples, the average number of bits per message (e.g., the resulted compressed channel bits) may be expressed as $Z \times M \times B_T \times B_R$, where Z may represent the average number of bits per coefficient, M may represent the number of time domain positions (e.g., time domain basis functions), $B_T$ may represent the number of spatial domain basis functions for determining (e.g., generating) the spatial model for the transmitting device (e.g., the base station), and $B_R$ may represent the number of spatial domain basis functions for determining (e.g., generating) the spatial model for the receiving device (e.g., the UE). The average number of bits per coefficient (e.g., Z), for example post quantization and encoding (e.g., entropy encoding), may be communicated to the base station (e.g., using a physical downlink control channel (PDCCH) or a physical uplink shared channel (PUSCH)) periodically or a-periodically. For example, the average number of bits per coefficient may be communicated according to scheduling by the base station (e.g., as may be performed according to one or more CSF mechanism). Additionally or alternatively, the NMSE of the compressed channel response (e.g., obtained from a MMSE solution of the 2D model), may be communicated to the base station periodically or a-periodically (e.g., per CSF report).

Additionally or alternatively, the number of bits used for quantization (e.g., the number of bit per real component or imaginary component of the channel coefficients) may be adaptively selected and communicated periodically or a-periodically (e.g., according to the parameters associated with the overhead-accuracy tradeoff). In some examples, the base station may indicate, to the UE, a desired number of bits for quantization. Additionally or alternatively, the base station may indicate, to the UE, a desired accuracy of the report (e.g., a desired NMSE or MSE of the set of channel coefficients) and the UE may select a number of bits (e.g., for quantization) accordingly. For example, to transmit the coefficients (e.g., which may represent the compressed channel response) to the base station, the UE may convert the coefficients into a binary representation, such that each coefficient component (e.g., real or imaginary) may be represented using a number (e.g., Z/2) of bits. In some examples, the UE may increase the number (Z) of bits to increase the accuracy of the representation of the channel (e.g., and the quantization error decreases). In such examples, the message payload may also increase. Therefore, a tradeoff between accuracy and reduction of the report overhead may be achieved by adjusting the number of bits used for quantization.

In some examples, the tradeoff between accuracy and overhead may be determined with respect to the channel conditions. For example, if the SNR is relatively low, the accuracy of the CSF may also be low and the UE may select (e.g., or may be instructed by the base station) to use fewer bits per coefficient. The UE may select the number of bits such that the quantization noise of the coefficients may not reduce (e.g., limit) the performance. For example, the number of bits may be determined such that the quantization noise may be below the thermal noise by a given factor. In another example (e.g., if the number of bits per coefficient is to set to a value), the number of bits per coefficient may be jointly adapted with other parameters (e.g., the number of basis functions) to increase the accuracy of the compressed channel.

In some examples, the UE may signal the selected number of bits for quantization to the base station. Additionally or alternatively, the UE may determine the number of bits for quantization with respect to the experienced MSE of the channel or with respect to the experienced SNR. In some examples, the UE may signal the selected number of bits for quantization to the base station. Additionally or alternatively, the UE may utilize a dictionary for compression of the coefficients, for example using an entropy encoder. In some examples, determination of the entropy encoder dictionary (e.g., dictionary symbols) may be performed to reduce the average message length (e.g., indicating the set of channel coefficients). Additionally or alternatively, the entropy encoder dictionary symbols may be predefined or communicated, to the UE from the base station, periodically or a-periodically. In some other examples, the UE may determine the entropy encoder dictionary using statistics of previous transmissions and may indicate the determined entropy encoder dictionary to the base station. In other examples, the base station may determine the entropy encoder dictionary to be used (e.g., by the UE) and indicate the determined entropy encoder dictionary to the UE. In some cases, the base station may indicate the determined entropy encoder dictionary to the UE with other UEs (e.g., jointly) to reduce complexities associated with operations at the base station.

Figure 5:
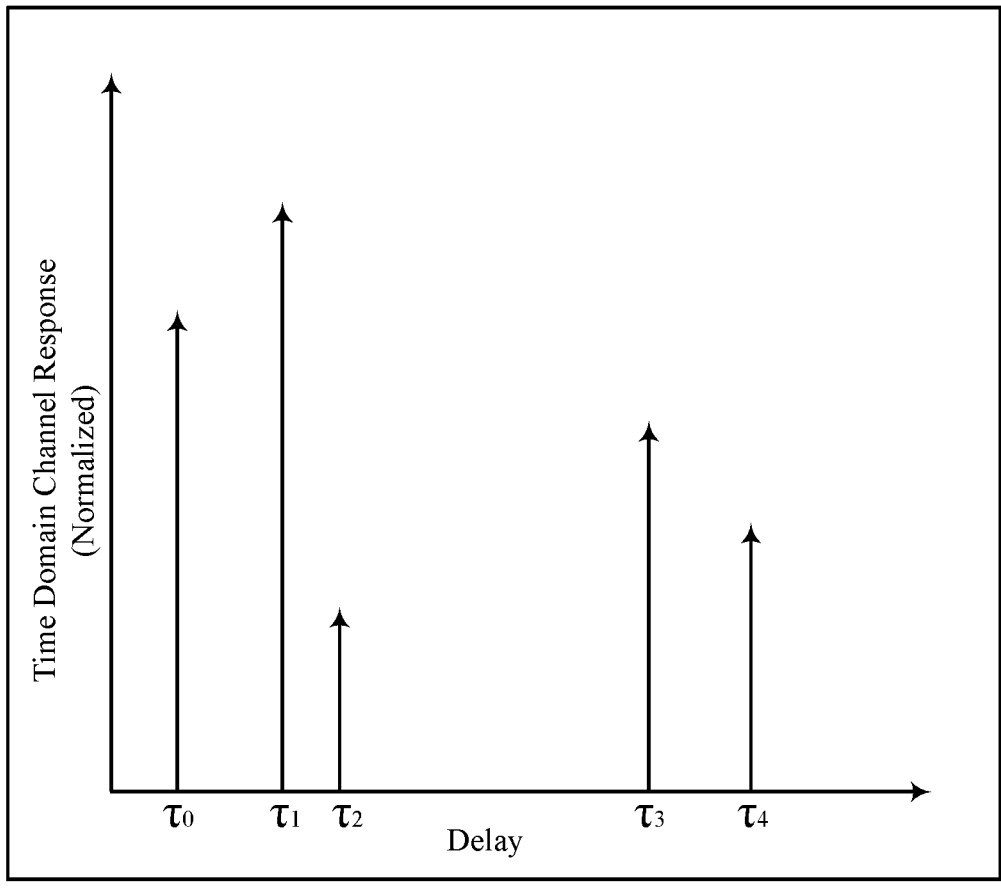
FIG. 5 illustrates an example of a time domain channel response diagram that supports channel compression for channel feedback reporting in accordance with aspects of the present disclosure.

FIG. 5 illustrates an example of a time domain channel response diagram 500 that supports channel compression for channel feedback reporting in accordance with aspects of the present disclosure. In some examples, the time domain channel response diagram 500 may implement or be implemented by aspects of wireless communications systems 100 and 200. For example, the time domain channel response diagram 500 may be associated with communications between a base station and a UE, which may be examples of corresponding devices described with reference to FIGS. 1 and 2.

In some examples, the set of channel coefficients may be generated using a 2D (e.g., time-space) model including a spatial model and a time domain response of a channel. For example, the spatial model may be generated from spatial domain basis functions and the time domain response of the channel may be generated based on time domain basis functions. In some examples, the spatial domain basis functions and the time domain basis functions may be examples of the corresponding basis functions described with reference to FIG. 3. For example, the spatial domain basis functions may reflect a correlation between antenna ports at a transmitting device (e.g., the base station) or between antenna port pairs at a receiving device (e.g., the UE) and the time domain basis functions may reflect time domain positions of the channel response.

In some examples, the time domain response of the channel (e.g., the time-frequency model) may be represented by a time domain transform of the frequency domain response of the channel. In other words, the time domain response of the channel may be evaluated from the frequency response of the channel. For example, the time domain response of the channel may correspond to the Fourier transform of the measured frequency domain response of the channel for each antenna port at the UE. That is, the frequency domain response of the channel may be measured and converted via a Fourier transform into the (e.g., sparse) time domain response. For example, the time domain response of the channel may be represented by the following equation:

$$\begin{bmatrix} h_0^{FD} \\ h_1^{FD} \\ \vdots \\ h_{Np-1}^{FD} \end{bmatrix} = \begin{bmatrix} F_c & 0 & 0 & 0 \\ 0 & F_c & 0 & 0 \\ 0 & 0 & \ddots & 0 \\ 0 & 0 & 0 & F_c \end{bmatrix} \cdot \begin{bmatrix} h_0^{TD} \\ h_1^{TD} \\ \vdots \\ h_{Np-1}^{TD} \end{bmatrix} + n \quad (1)$$

where, $$h_i^{FD}$$

may represent the frequency domain response (e.g., where $$h_i^{FD}$$

is a vector including a number (N) of frequency domain coefficients) of the channel measured at the (ith) antenna port (e.g., where i ranges from 0 to Np−1), $$h_i^{TD}$$

may represent the time domain response (e.g., where $$h_i^{TD}$$

is a vector including a number (M) of time domain coefficients) of the channel (e.g., the Fourier transform of the frequency-domain response), and n may represent noise. Further, each matrix $F_c$ may represent a set of time domain (e.g., impulse response domain) basis functions (e.g., where $F_c$ is a matrix with a number (N) of rows and a number (M) of columns) that, in some cases, may be a sparse Fourier matrix cut to a selected number (N) of time domain basis function rows, each with a number (M) of coefficients.

In some examples, the time domain basis functions (e.g., $F_c$) may be determined based on the energy of the time domain response of the channel at different time positions (e.g., delays). For example, the UE may select a number (M) of time delays (e.g., time domain basis functions) in which the energy of the time domain response is relatively high, for example compared to the time domain response at other time delays. In some cases, the UE may determine (e.g., find) the time domain response of the communication channel at multiple transmit antenna ports (e.g., each antenna port used for uplink communications to the base station) and at multiple receive antenna ports (e.g., each antenna port used for downlink communications from the base station) and accumulate the energy (e.g., over each of the transmit and receive antenna ports) for a number of time delays (e.g., M time delays). For example, as illustrated in the example of FIG. 5, the time domain channel response diagram 500 illustrates the normalized time domain response of the communication channel (e.g., the time domain channel response) at various time delays (e.g., $\tau_0$, $\tau_1$, $\tau_2$, $\tau_3$, $\tau_4$). In some cases, the UE may select the top M time delays (e.g., positions) as the time domain basis functions. As a concrete example, if M is equal to 3, the time domain positions may include $\tau_0$, $\tau_1$, and $\tau_3$.

In some other examples, the UE may use an iterative approach to find M time positions (e.g., a matching pursuit). For example, the UE may iteratively evaluate different time delay combinations and select a combination of time delays for which the expected mean square error (MSE) of the estimated channel is reduced. In some examples, during each iteration (e.g., at each round) the UE may loop over a configured or predefined number (m) of available time positions (e.g., $\tau_0$, $\tau_1$, $\tau_2$, $\tau_3$, $\tau_4$, where m is equal to 5) and evaluate the expected MSE, for example if each of the available time positions were to be added to a subset of time positions. The UE may use the expected MSE to determine a time position to be added (e.g., selected) during the respective iteration (e.g., round) and continue iterating, for example until a desired number (M) of positions are selected. In some examples, the UE may also perform a refinement stage. For example, the UE may loop over M selected time positions and, during each iteration, remove one time position (e.g., from the set of M time positions) and search for another (e.g., not yet selected) time position of the number (m) of available time positions such that the MSE would be improved. In some cases, if the MSE is (e.g., actually) improved with the other time position, the UE may replace the removed time position with the other time position.

In some examples, the UE may indicate the selected time positions as the time domain basis functions to the base station. In some cases, the indication may be direct or in a differential manner (e.g., the indication may correspond to a difference from a previous state). In some cases, the base station may signal, to the UE, the number (M) of time positions to be used. In some other cases, the UE may report the number of time positions (M) to the base station. Further, the base station may signal, to the UE, a time domain granularity to be used (e.g., for determining the time domain basis functions) or the UE may report a time domain granularity to the base station. Additionally or alternatively, the base station may signal a desired (e.g., target) accuracy of the report (e.g., a desired MSE for the compressed channel response) and the UE may determine a number of time positions or a time domain granularity based on the desired MSE. In some cases, the UE may report the number of time positions or time domain granularity to the base station. In some examples, the number of time positions or time domain granularity may be used by the base station to reconstruct the time domain response of the channel. Additionally or alternatively, the base station may indicate a codebook of time domain basis functions to the UE. In such an example, the UE may select the set of time domain basis functions from the indicated codebook. Additionally or alternatively, the UE may report indices of the selected time domain basis functions of the codebook to the base station.

In some cases, the UE may signal periodically updated basis functions (e.g., the time domain basis functions or the spatial domain basis functions), for example where the update interval is based on a predefined value (e.g., separately) determined by both the base station and the UE, a predefined value selected by the UE based on the mobility state of the UE, the velocity of the UE, or a value configured by the base station (e.g., via a radio resource control (RRC) message). In such cases, each indication may have a specific periodicity. In some other cases, the basis functions may be updated a-periodically, for example, the UE or base station may request an a-periodic update of the basis vectors based on a change in communication bandwidth or a reduced target accuracy of the report or a reduced MSE (e.g., decline in the measured MSE). In such cases, each indication may be communicated using a downlink control information (DCI), a MAC-CE, or an RRC message.

In some examples, the spatial model (e.g., the time-space model) may be evaluated using the time domain response of the channel or the frequency domain response of the channel. For example, the spatial model may be generated based on a spatial behavior of the time domain response of the channel or the frequency domain response of the channel. In some examples, the spatial model may correspond to (e.g., involve) each time domain delay (e.g., tap) over space expressed as a linear combination of the spatial domain basis functions. In some examples, the spatial model may be represented by the following equation:

$$
\begin{bmatrix} h_0^{TD}[m] \\ h_1^{TD}[m] \\ \vdots \\ h_{Np-1}^{TD}[m] \end{bmatrix} = \begin{bmatrix} U_{0,0} & U_{0,1} & \dots & U_{0,Br-1} \\ U_{1,0} & U_{1,1} & \dots & U_{1,Br-1} \\ \vdots & \vdots & \ddots & \vdots \\ U_{Np-1,0} & U_{Np-1,1} & \dots & U_{Np-1,Br-1} \end{bmatrix} \cdot \begin{bmatrix} c_0[m] \\ c_1[m] \\ \vdots \\ c_{Br-1}[m] \end{bmatrix} \tag{2}
$$

where, $$
h_i^{TD}[m]
$$

may represent the time domain response (e.g., time domain tap) of the channel measured at the (ith) antenna port of the UE (e.g., where i ranges from 0 to Np−1) and $c_j[m]$ may represent the time-space response of the estimated communication channel (e.g., where j ranges from 0 to Br−1). Additionally or alternatively, each matrix $U_{i,j}$ may represent the spatial domain basis functions. As such, the involvement of each time domain response $$
(h_i^{TD}[m])
$$

across the antennas (e.g., space) map be represented using a number of basis functions (Br) less than the number of frequency domain coefficients (e.g., Br<Np). As illustrated by equation 2, the Np values of the time domain responses may be described as a linear combination of the Br basis functions, and the Br weights of the linear combination may be the vector c (e.g., $c_0[m]$ through $c_{Br-1}[m]$). In some examples, different time domain responses $$
(h_i^{TD}[m])
$$

may use a same basis function (e.g., the U matrix), but a different c vector (e.g., weights).

In some examples, multiple techniques may be used to determine the spatial domain basis functions. Different techniques may be applied, for example for the antenna port arrays at the transmitting device or the base station and the antenna port arrays at the receiving device or the UE, to select the spatial domain basis functions. In one example, the UE may select the spatial domain basis functions by evaluating an autocorrelation matrix, for example of the UE antenna port arrays or the base station antenna port arrays. In some examples, the UE may evaluate the autocorrelation matrix by directly measuring the correlation between each pair of antenna ports (e.g., each pair of antenna ports at the UE or each pair of antenna ports at and the base station). In some other examples, the UE may measure the lowest correlated pair of antenna ports (e.g., from the set of correlated pairs of antenna ports) and evaluate the correlation between the other correlated pairs of antenna ports (e.g., of the set of correlated pairs of antenna ports) using linear interpolation. For example, to select the spatial domain basis function based on the lowest correlated antenna ports the base station may indicate a number (e.g., 2) antenna ports at an antenna array of the base station with a lowest correlation (e.g., relative to other antenna ports at the respective antenna array). In response, the UE may evaluate the correlation between the indicated antenna ports and determine the spatial domain basis function based on the correlation value.

In yet some other examples, the UE may use the 2D topology of the antenna array (e.g., at the UE or at the base station) as a model of the autocorrelation matrix. In such examples, the UE may measure the correlation of one or more pairs of ports (e.g., at the base station) and extrapolate the correlation for the other pairs of antenna ports (e.g., of the set of correlated pairs of antenna ports at the base station) assuming the correlation is of the form: $p = f_1 e^{-d^* f_2}$, where $f_1$ and $f_2$ may correspond to parameters of the 2D topology model which may be adjusted to fit the model to observations and d may correspond to the distance between the correlated (e.g., two) antenna ports. In some examples, the correlation between antenna port pairs at the base station may be measured (e.g., by the UE) using a type of reference signal (e.g., a CSI-RS) to determine the autocorrelation matrix for the base station. In some other examples, another type of reference signal (e.g., an SRS) may be used (e.g., by the base station) to determine the autocorrelation matrix for the UE. In some other cases, any downlink reference signal may be used to determine the autocorrelation matrix for the base station and any uplink reference signal may be used to determine the autocorrelation matrix for the UE.

In some other examples, the UE may determine the spatial domain basis functions by performing a SVD for the spatial autocorrelation matrix. For example, the SVD may be expressed as:

$$[U, S, V] = svd(R_{bs}) \tag{3}$$

where U, S, and V may each be an N×N matrix and $R_{bs}$ may be the autocorrelation matrix at the base station.

In such an example, the UE may select the first B vectors (e.g., eigenvectors) corresponding to the largest B eigenvalues (e.g., of the set of eigenvalues). For example, the UE may find eigenvectors that correspond to a linear combination of antenna ports in which a relatively large amount of variations (e.g., in the channel response) may occur, for example compared to variations in the channel response for other linear combinations of antenna ports. In some examples, the selected eigenvectors (e.g., basis functions) may be represented as:

$$W = \begin{bmatrix} U_{0,0} & U_{0,1} & \dots & U_{0,B-1} \\ U_{1,0} & U_{1,1} & \dots & U_{1,B-1} \\ \vdots & \vdots & \ddots & \vdots \\ U_{Np-1,0} & U_{Np-1,1} & \dots & U_{Np-1,B-1} \end{bmatrix}. \tag{4}$$

In some examples, one or more signals may support evaluation of the autocorrelation matrix. For example, the base station may indicate, to the UE (e.g., or the UE may indicate to the base station), one or more antenna ports pairs with a relatively low correlation. In some examples, the base station may indicate, to the UE (e.g., or the UE may indicate to the base station), the 2D topology of the antenna array of the respective device. In other examples, the base station may indicate the UE autocorrelation matrix to the UE. In some cases, the indication may be in a direct or in a differential manner (e.g., the indication may correspond to a difference from a previous state). In some examples, the base station may indicate which of the antenna port pairs at the UE correspond to the lowest correlated antenna port pair, for example of the set of antenna port pairs. In some other examples, the base station may indicate the 2D topology models (e.g., $f_1$ and $f_2$) to the UE.

In some examples, one or more signals may support selection of the spatial domain basis functions. For example, the base station may indicate the number of spatial domain basis functions (e.g., $B_T$ or $B_R$) to be used to the UE. The base station may indicate a desired accuracy of the report (e.g., a desired MSE for the compressed channel response) and the UE may determine a number of spatial domain basis functions (e.g., $B_T$ or $B_R$) based on the indicated MSE. In some cases, the UE may report the number of spatial domain basis functions to be used to the base station. In other cases, the base station may indicate spatial domain basis function values for the receive antenna or indices of a predefine set of basis functions to the UE. In further cases, the indication may be direct or in a differential manner (e.g., the indication may correspond to a difference from a previous state). The UE may indicate the transmit antenna basis function values or the indices of a predefine set of basis functions to the base station. In some examples, the indication may be in a direct or in a differential manner (e.g., the indication may correspond to a difference from a previous state). In some examples, each optional indication may be transmitted periodically (e.g., with a dedicated periodicity for each indication type) or a-periodically. For example, the indications may be communicated using a DCI, a medium access control-control element (MAC-CE), or an RRC message.

In some examples, the spatial model may be separately written from the perspective of the transmitting device (e.g., the base station) as:

$$\begin{bmatrix} h_{0,rx}^{TD}[m] \\ h_{1,rx}^{TD}[m] \\ \vdots \\ h_{N_p^{TX}-1,rx}^{TD}[m] \end{bmatrix} = \tag{5}$$

$$\begin{bmatrix} U_{0,0} & U_{0,1} & \dots & U_{0,B_T-1} \\ U_{1,0} & U_{1,1} & \dots & U_{1,B_T-1} \\ \vdots & \vdots & \ddots & \vdots \\ U_{N_p^{TX}-1,0} & U_{N_p^{TX}-1,1} & \dots & U_{N_p^{TX}-1,B_T-1} \end{bmatrix} \cdot \begin{bmatrix} c_0[m] \\ c_1[m] \\ \vdots \\ c_{B_T-1}[m] \end{bmatrix}$$

and from the perspective of the receiving device (e.g., the UE) as:

$$\begin{bmatrix} h_{tx,0}^{TD}[m] \\ h_{tx,1}^{TD}[m] \\ \vdots \\ h_{tx,N_p^{RX}-1}^{TD}[m] \end{bmatrix} = \tag{6}$$

$$\begin{bmatrix} U_{0,0} & U_{0,1} & \dots & U_{0,B_R-1} \\ U_{1,0} & U_{1,1} & \dots & U_{1,B_R-1} \\ \vdots & \vdots & \ddots & \vdots \\ U_{N_p^{RX}-1,0} & U_{N_p^{RX}-1,1} & \dots & U_{N_p^{RX}-1,B_R-1} \end{bmatrix} \cdot \begin{bmatrix} c_0[m] \\ c_1[m] \\ \vdots \\ c_{B_R-1}[m] \end{bmatrix}$$

where $$h_{i,rx}^{TD}[m] \text{ and } h_{tx,i}^{TD}[m]$$

may represent the time domain response of the channel measured at the (ith) antenna port of the base station and the UE, respectively (e.g., where i ranges from 0 to Np−1) and $c_i[m]$ represents the time-space response of the estimated channel.

In such an example, the time domain response of the channel may be written as:

$$\begin{bmatrix} h_{0,rx}^{FD} \\ h_{1,rx}^{FD} \\ \vdots \\ h_{Np-1,rx}^{FD} \end{bmatrix} = \begin{bmatrix} F_c & 0 & 0 & 0 \\ 0 & F_c & 0 & 0 \\ 0 & 0 & \ddots & 0 \\ 0 & 0 & 0 & F_c \end{bmatrix} \cdot \begin{bmatrix} h_{0,rx}^{TD} \\ h_{1,rx}^{TD} \\ \vdots \\ h_{Np-1,rx}^{TD} \end{bmatrix} + n \quad (7)$$

and the 2D model (e.g., time-space model) may be expressed as a Kronecker product of the time domain response of the channel and the spatial model. For example, the 2D model may be written as:

$$h^{FD} = \begin{bmatrix} h_{0,0}^{FD} \\ h_{1,0}^{FD} \\ \vdots \\ h_{N_p^{TX}-1,N_p^{RX}}^{FD} \end{bmatrix} = \qquad (8)$$

$$\left( \begin{bmatrix} F_c & 0 & 0 & 0 \\ 0 & F_c & 0 & 0 \\ 0 & 0 & \ddots & 0 \\ 0 & 0 & 0 & F_c \end{bmatrix} \otimes \begin{bmatrix} U_{0,0} & U_{0,1} & \cdots & U_{0,B_T-1} \\ U_{1,0} & U_{1,1} & \cdots & U_{1,B_T-1} \\ \vdots & \vdots & \ddots & \vdots \\ U_{N_p^{TX}-1,0} & U_{N_p^{TX}-1,1} & \cdots & U_{N_p^{TX}-1,B_T-1} \end{bmatrix} \otimes \right.$$

$$\left. \begin{bmatrix} U_{0,0} & U_{0,1} & \cdots & U_{0,B_R-1} \\ U_{1,0} & U_{1,1} & \cdots & U_{1,B_R-1} \\ \vdots & \vdots & \ddots & \vdots \\ U_{N_p^{RX}-1,0} & U_{N_p^{RX}-1,1} & \cdots & U_{N_p^{RX}-1,B_R-1} \end{bmatrix} \right) \cdot \begin{bmatrix} c_{0,0} \\ c_{1,1} \\ \vdots \\ c_{B_r-1,B_R-1} \end{bmatrix} + n = A \cdot c + n$$

Here, c may be a vector which represents the channel coefficients, A may represent the 2D model, $\sigma^2$ may represent the SNR, I may represent an identity matrix, and $h^{FD}$ may represent the measured frequency domain response of the channel. That is, equation 8 may describe the relationship between the measured frequency domain response of the channel ($h^{FD}$) and the channel coefficients (c) that express the compressed channel response. In some examples, the values of the channel coefficients (e.g., the vectors, c) may be calculated using the linear minimum mean square error (LMMSE) of the following equation:

$$c = (A^H \cdot A + \sigma^2 I)^{-1} A^H \cdot h^{FD}. \qquad (9)$$

Additionally or alternatively, the channel coefficients (c) may be calculated per CSF report using the LMMSE solution (e.g., adaptive of the SNR).

In some examples, the UE may dynamically evaluate different combinations of channel compression parameters to determine a channel compression configuration that may reduce the expected error (e.g., MSE). For example, dynamic configuration of the channel compression may be used such that, for a given report size, the UE may dynamically (e.g., per report) evaluate one or more configuration options (e.g., with a report size smaller or equal to a predetermined size), select an option with a desirable performance (e.g., a reduced MSE), and transmit a report (e.g., an indication of a set of channel coefficients) accordingly. In some examples, dynamically evaluating different combinations of channel compression parameters may improve performance, for example by improving the tradeoff between the channel compression parameters (e.g., per realized channel response). In some examples, the parameters that may be considered for dynamic configuration may include a number of spatial domain basis functions, a number of spatial domain basis function indices (e.g., corresponding to one or more predefined spatial domain basis functions), a number of time domain basis functions, or a number of quantization bits.

In some examples, one or more options may be considered to achieve reduced signaling overhead. For example, the time domain basis functions and the spatial domain basis functions may be ordered with respect to a respective expected contribution to performance. In some examples, as the number of basis functions increases, the accuracy of the compressed channel estimation also increases. However, the contribution of each basis function for an achieved accuracy may not be the same. Therefore, the basis functions may be ordered according to an expected contribution (e.g., according to a corresponding eigenvalue order) such that if the UE determines (e.g., dynamically) to reduce the number of basis functions to a number (K) the UE may select the top K basis functions from the ordered list. Thus, rather than reporting the selected basis functions (e.g., K indices each corresponding to a selected basis function), the UE may report the value K thereby reducing overhead.

The number of time domain basis functions and the number of spatial domain basis functions may be dynamically signaled (e.g., to the UE) and selected according to the ordering. The UE may switch between one or more different configuration sets (e.g., sets of parameters for dynamic configuration) for example, using a dedicated set selection parameter. In some examples, each configuration option may be determined based on the number of time domain basis functions or the number of spatial domain basis functions. In some examples, the number of time domain basis functions or the number of spatial domain basis functions may be indicated (e.g., jointly) with the number of quantized bits (e.g., the number of bits to be used for quantization). In some examples, one or more basis functions (e.g., spatial domain basis functions or time domain basis functions) may be replaced, by the UE, using one or more dedicated parameters.

In some examples, the base station may indicate, to the UE, an ordering of spatial domain basis functions from which the UE may dynamically select one or more spatial domain basis functions to be used in the spatial model. In some examples, the UE may report the selected spatial domain basis functions or an ordering of the selected spatial domain basis functions to the base station (e.g., for reconstructing the spatial model). The base station may indicate an ordering of time domain basis functions from which the UE may dynamically select one or more time domain basis functions to be used in the time domain response of the channel. In some examples, the UE may report the selected time domain basis functions or an ordering of the selecting time domain basis functions to the base station (e.g., for reconstructing the time domain response of the channel). The base station may indicate a list of configuration sets (e.g., one or more configurations including a set of spatial domain basis functions and a of time domain basis functions) from which the UE may dynamically select a configuration to be used to determine the time domain response of the channel and the spatial model. In some examples, the UE may report the selected configuration to the base station. Each configured set may include a number of spatial domain basis functions, a number of time domain basis functions, or a number of bits to use for quantization. In some examples, the UE may report the selected configuration to the base station. In some examples, the base station may indicate a number of time domain basis functions, a number of spatial domain basis functions, or a number of bits to use for quantization to the UE. In some other examples, the UE may report the number of time domain basis functions, the number of spatial domain basis functions, or the number of bits to use for quantization to the base station. In some examples, one or more of the indications may be indicated via a DCI, a MAC-CE, or a RRC message.

Figures 6A, 6B:
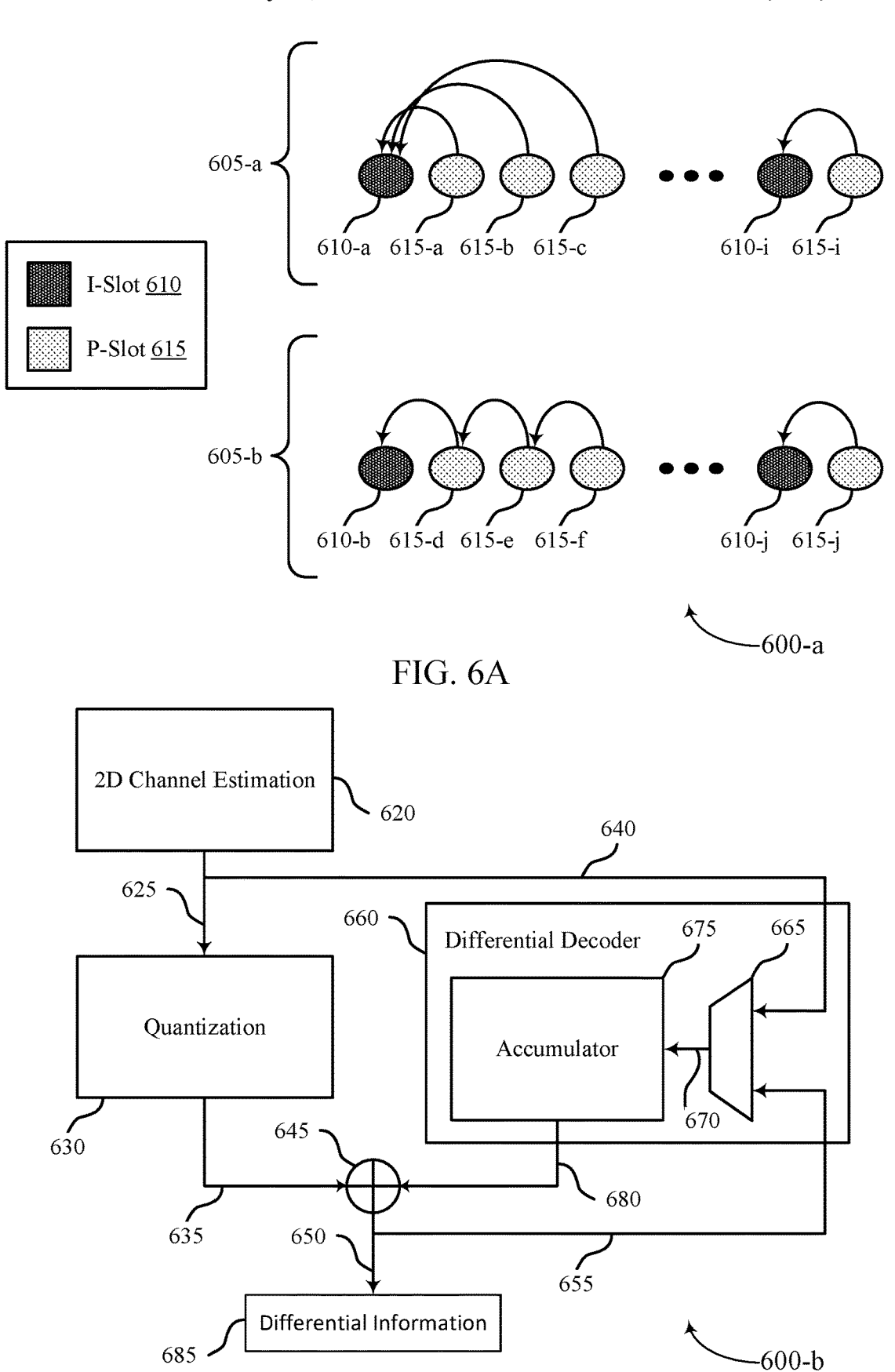
FIGS. 6A and 6B each illustrate an example of a differential encoding scheme that supports channel compression for channel feedback reporting in accordance with aspects of the present disclosure.

FIGS. 6A and 6B each illustrate an example of a differential encoding scheme 600 that supports channel compression for channel feedback reporting in accordance with aspects of the present disclosure. In some examples, differential encoding schemes 600 (e.g., a differential encoding scheme 600-a and a differential encoding scheme 600-b) may include aspects of the wireless communications systems 100 and 200 described with respect to FIGS. 1 and 2, respectively. For example, the differential encoding schemes 600 may be implemented by a UE 115 which may be an example of the correspond device described with reference to FIGS. 1 and 2.

As illustrated in the example of FIG. 6A, a UE may use differential encoding to increase the accuracy at which the set of channel coefficients represents the estimated channel. In some cases of differential encoding, the UE may send (e.g., indicate) the channel coefficients at a reduced periodicity, for example at intra-coded slots (e.g., I-slots 610), and send (e.g., indicated) changes in the set of channel coefficients at inter-coded slots (e.g., P-slots 615). In other words, differential encoding may include sending the channel coefficients at a low periodicity at "Intra-coded slots" ("I-slots") and sending the changes in the coefficients at the other "Inter-coded slots" ("P-slots"). In the example of differential encoding option 605-a, the change in channel coefficients indicated at a given P-slot 615 (e.g., a P-slot 615-b) may be measured relative to the value of the channel coefficients measured at an anchor slot (e.g., an I-slot 610-a). For example, the channel coefficients may be differential with respect to an anchor slot (I-slot). In the example of differential encoding option 605-b, the change in channel coefficients indicated at a given P-slot 615 (e.g., a P-slot 615-e) may be measured relative to a previous slot (e.g., a P-slot 615-d). For example, the channel coefficients may be differential with respect to the previous slot. In some cases, the changes may be measured from the reconstructed channel at the receiver (e.g., from the perspective of the base station).

As illustrated in the example of FIG. 6B, a UE may perform 2D channel estimation 620 to obtain a set of channel coefficients. At 625, the UE may compress the set of channel coefficients using quantization 630. In some examples, the 2D channel estimation and the quantization 630 may be examples of the corresponding processes described with reference to FIG. 3. In some examples, channel coefficients corresponding to a reconstructed channel (e.g., reconstructed channel coefficients) may be subtracted from the quantized set of channel coefficients, at 635, to calculate a set of differential channel coefficients (e.g., via an operator 645). In some examples, the operator 645 may output the set of differential channel coefficients at 650 to differential information 685 to be transmitted on P-slots. In some cases, the P-slots may be examples of P-slots described with reference to FIG. 6A. Additionally or alternatively, at 655 the set of differential channel coefficients may be input into a differential decoder 660. For example, the set of differential channel coefficients may be input into a multiplexor 665. At 640 the set of channel coefficients generated from the 2D channel estimation 620 (e.g., the set of channel coefficients to be transmitted in I-slots) may be input into the differential decoder 660. In some cases, the I-slots may be examples of I-slots described with reference to FIG. 6A. For example, the set of channel coefficients may be input into a multiplexor 665. In some cases, the set of channel coefficients may be multiplexed with the set of differential channel coefficients via the multiplexor 665. At 670 the output of the multiplexor

665 may be input (e.g., and stored) in an accumulator 675. In some examples, the accumulator 675 may reset on I-slots (e.g., the anchor slots). At 680, the output of the accumulator 675 (e.g., the reconstructed channel coefficients) may be subtracted from a quantized set of channel coefficients via the operator 645 and the output may correspond to the set of differential channel coefficients measured with respect to a previous P-slot.

In some examples, an entropy encoder may be applied to the output of the differential encoder (e.g., the differential decoder 660), for example to compress the transmitted message (e.g., the indication of the set of differential channel coefficients). In some examples, the entropy encoder may utilize a relatively high imbalance of probabilities of the output values of the differential decoder 660. In some examples, the dictionary of the entropy encoder (e.g., or entropy decoder) may have different configurations. For example, the dictionary of the entropy encoder may be a predefined dictionary (e.g., with respect to the quantization number of bits) or the dictionary of the entropy encoder may be updated (e.g., over time) by collecting and analyzing statistical information of the output values of the differential decoder 660.

Figure 7:
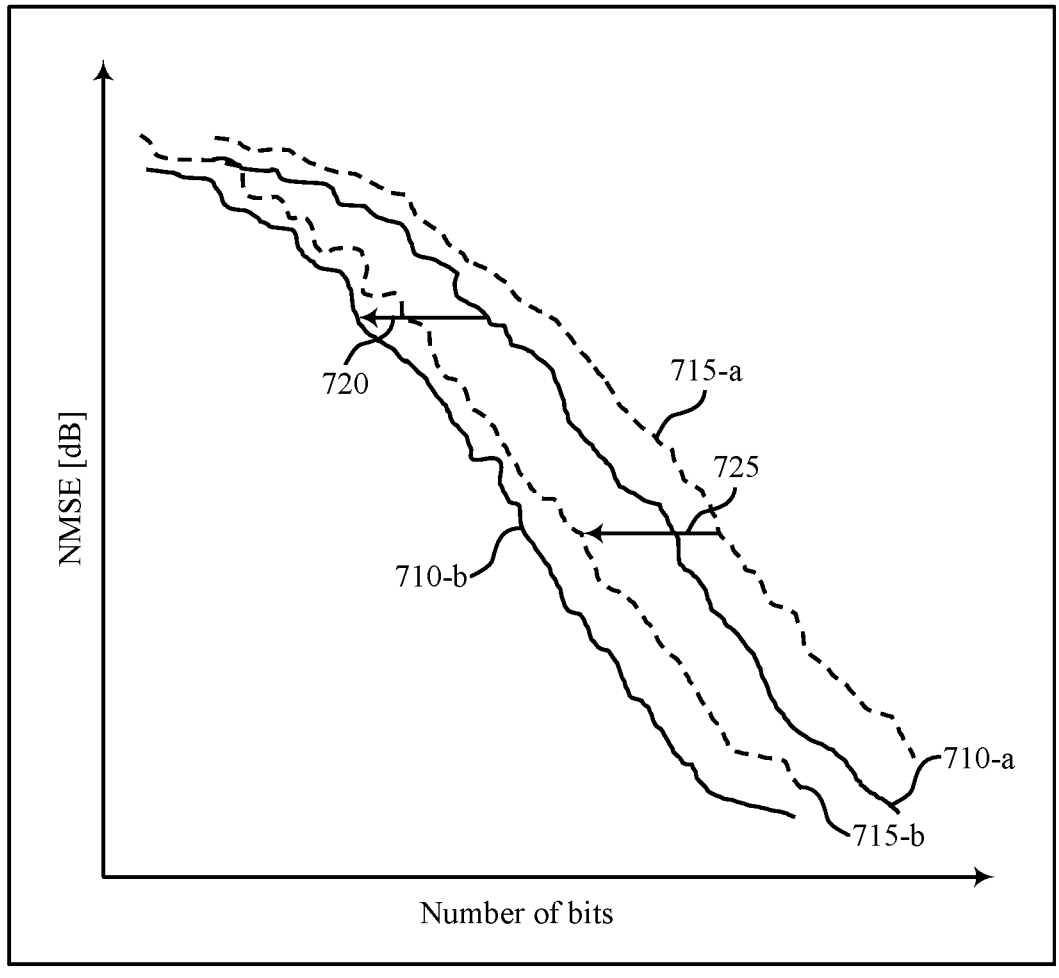
FIG. 7 illustrates an example of a performance response diagram that supports channel compression for channel feedback reporting in accordance with aspects of the present disclosure.

FIG. 7 illustrates an example of a performance response diagram 700 that supports channel compression for channel feedback reporting in accordance with aspects of the present disclosure. In some examples, the performance response diagram 700 may implement or be implemented by aspects of wireless communications systems 100 and 200. For example, the performance response diagram 700 may be associated with communications between a base station and a UE, which may be examples of corresponding devices described with reference to FIGS. 1 and 2.

As illustrated in the example of FIG. 7, the accuracy at which the channel estimation report (e.g., a set of channel coefficients indicated to the base station) represents the estimated channel may depend on the number of bits used to represent the estimated channel (e.g., the average number of bits per coefficient). For example, the performance response diagram 700 illustrates the NMSE of the compressed channel (e.g., obtained from a MMSE solution of the 2D model) plotted as a function of bits, where a performance response 715 (e.g., a performance response 715-a and a performance response 715-b) represents a set of channel coefficients generated using a set of basis functions that may be updated every 60 slots and a performance response 710 (e.g., a performance response 710-a and a performance response 710-b) represents a set of channel coefficients generated using a set of basis functions that may be updated every 16 slots. In some examples, the performance response 715-b and the performance response 710-b may represent the performance using differential decoding (e.g., encoding). For example, the respective sets of channel coefficients used to achieve the performance response 715-b and the performance response 710-b may be sets of differential channel coefficients generated using differential encoding described throughout the disclosure including with respect to FIG. 6A and FIG. 6B.

In the example of FIG. 7, the performance of different tradeoffs between signaling overhead in bits and the accuracy of the channel estimation report (e.g., the NMSE of the compressed channel response) may be based on a 20 MHz channel bandwidth, 32 antenna ports at the transmitting device (e.g., the base station), and 1 antenna port at the receiving device (e.g., the UE). In some examples, the different tradeoffs (e.g., performance responses) may be achieved using different numbers of time domain basis functions, different numbers of spatial domain basis functions, or a different number of quantized bits (e.g., bits used for quantization of the set of channel coefficients). As illustrated in the example of FIG. 7, applying a differential encoder may reduce the signaling overhead. For example, an arrow 725 illustrates a reduction in the signaling overhead (e.g., number of bits) between the performance response 715-a and the performance response 715-b and an arrow 720 illustrates a reduction in the signaling overhead (e.g., number of bits) between the performance response 710-a and the performance response 710-b.

In some examples, the base station may indicate the number of bits for quantization to be used to the UE or, in some other examples, the UE may report the number of bits used for quantization by the UE to the base station. In some examples, the base station may transmit an indication to the UE for the UE to enable or disable differential encoding. In some other examples, the UE may indicate whether differential encoding may be enabled or disable to the base station. The base station may indicate a method for differential encoding to the UE. For example, the UE may indicate whether the set of differential channel coefficients may be measured relative to a P-slot or an I-slot. In some examples, the method for differential encoding may be based on the mobility of the UE and a time gap (e.g., interval) between CSF reports (e.g., consecutive CSF reports). The base station may indicate an I-slot periodicity to the UE or the UE may indicate an I-slot periodicity to the base station. The base station may indicate a dictionary for the entropy encoder to the UE or the UE may report the dictionary for the entropy encoder to the base station. In some examples, the dictionary for the entropy encoder may be indicate to multiple UEs (e.g., jointly) to reduce complexities associated with operations at the base station. In some examples, the base station may indicate a desired accuracy of the report (e.g., a desired NMSE or MSE of the compressed channel response) and the UE may determine a number of bits for quantization or an I-slot periodicity to use based on the desired accuracy indicated to the UE.

In some examples, one or more of the indications may be transmitted periodically or a-periodically. For example, the indications may be transmitted periodically based on a predefined value determined by the base station and the UE, a predefined value per UE velocity, or a value updated by the base station (e.g., via an RRC message). In such an example, each indication may have a dedicated periodicity. In another example, the basis functions may be updated a-periodically. For example, the UE or the base station may request an a-periodic update of the basis vectors based on the mobility of the UE or a reduced MSE (e.g., decline in the measured MSE). In such an example, each indication may be communicated using a DCI, a MAC-CE, or an RRC message.

Figure 8:
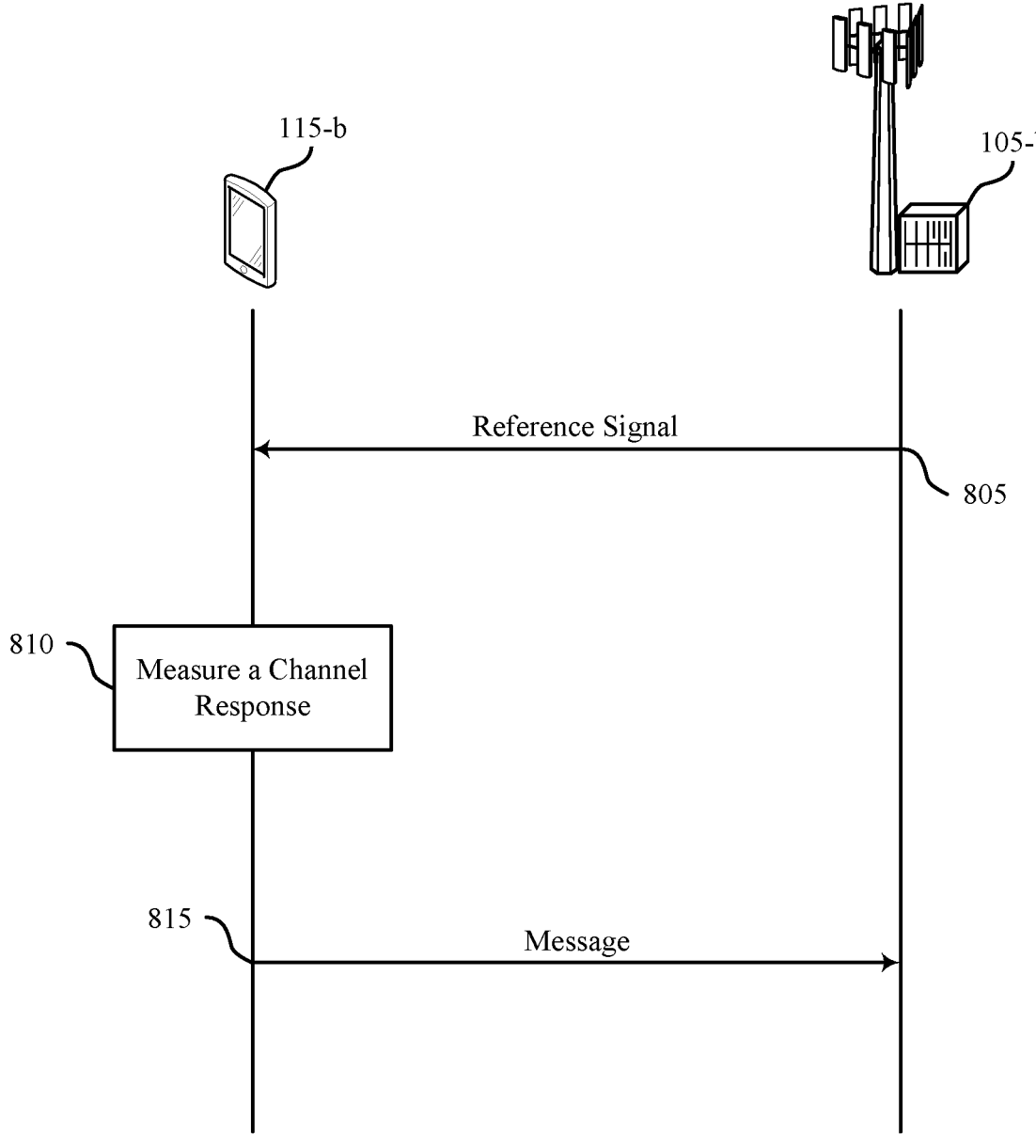
FIG. 8 illustrates an example of a process flow that supports channel compression for channel feedback reporting in accordance with aspects of the present disclosure.

FIG. 8 illustrates an example of a process flow 800 that supports channel compression for channel feedback reporting in accordance with aspects of the present disclosure. In some examples, the process flow 800 may implement or be implemented by one or more aspects of the wireless communications systems 100 and 200. For example, the process flow 800 may be implemented by base station 105-b or a UE 115-b, which may be examples of the corresponding devices described with reference to FIGS. 1 and 2. In the following description of the process flow 800, the operations between the UE 115-b and the base station 105-b may be transmitted in a different order than the example order shown, or the operations performed by the UE 115-b and the base station 105-b may be performed in different orders or at different times. Some operations may also be omitted.

As illustrated in the example of FIG. 8, the UE 115-b may receive one or more reference signals from the base station 105-b at 805. In some examples, the UE 115-b may receive the one or more reference signals over a channel for communications between the UE 115-b and the base station 105-b. In some cases, the one or more reference signals may be reference signals (e.g., CSI-RSs) described with reference to FIG. 5. At 810, the UE 115-b may measure a response of the channel. In some examples, the UE 115-b may measure the response based on the one or more reference signals received over the channel. At 815, the UE 115-b may transmit a message indicating a set of channel coefficients. In some cases, the set of channel coefficients may correspond to a 2D model representative of the response. In some examples, the 2D model may include a spatial model and a time domain response of the channel. In some cases, the spatial model and the time domain response of the channel may be examples of the spatial model and the time domain response of the channel described with reference to FIGS. 3 through 5.

Figure 9:
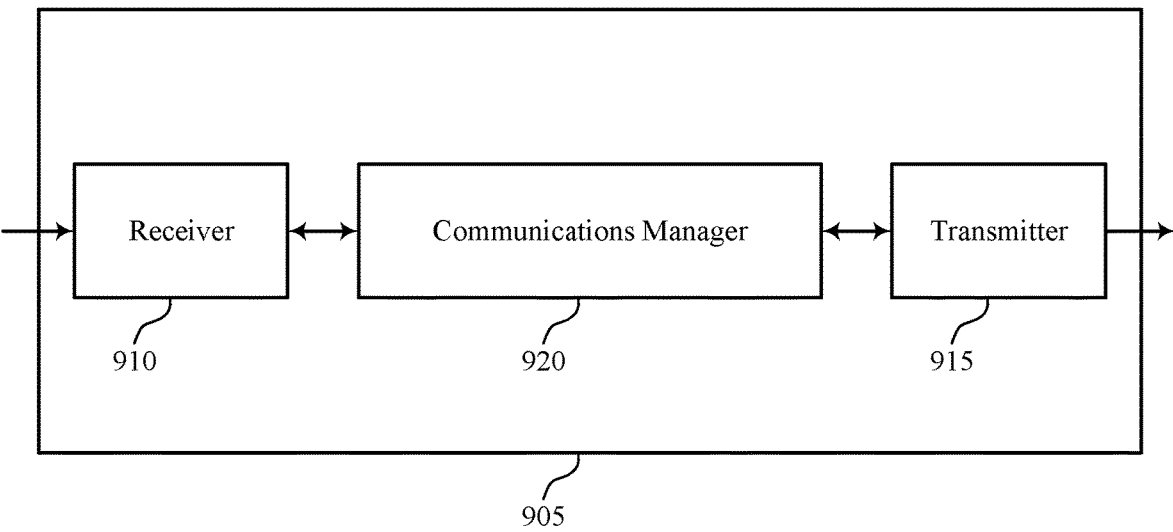
FIGS. 9 and 10 show block diagrams of devices that support channel compression for channel feedback reporting in accordance with aspects of the present disclosure.
Figure 9:

FIG. 9 shows a block diagram 900 of a device 905 that supports channel compression for channel feedback reporting in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to channel compression for channel feedback reporting). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to channel compression for channel feedback reporting). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of channel compression for channel feedback reporting as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving, from a base station, at least one reference signal over a communication channel for wireless communication between the UE and the base station. The communications manager 920 may be configured as or otherwise support a means for determining a response of the communication channel based on the at least one reference signal received over the communication channel. The communications manager 920 may be configured as or otherwise support a means for transmitting, to the base station, a message indicating a set of channel coefficients corresponding to a 2D model representative of the response, the 2D model including a spatial model and a time domain response of the communication channel.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing and more efficient utilization of communication resources.

Figure 10:
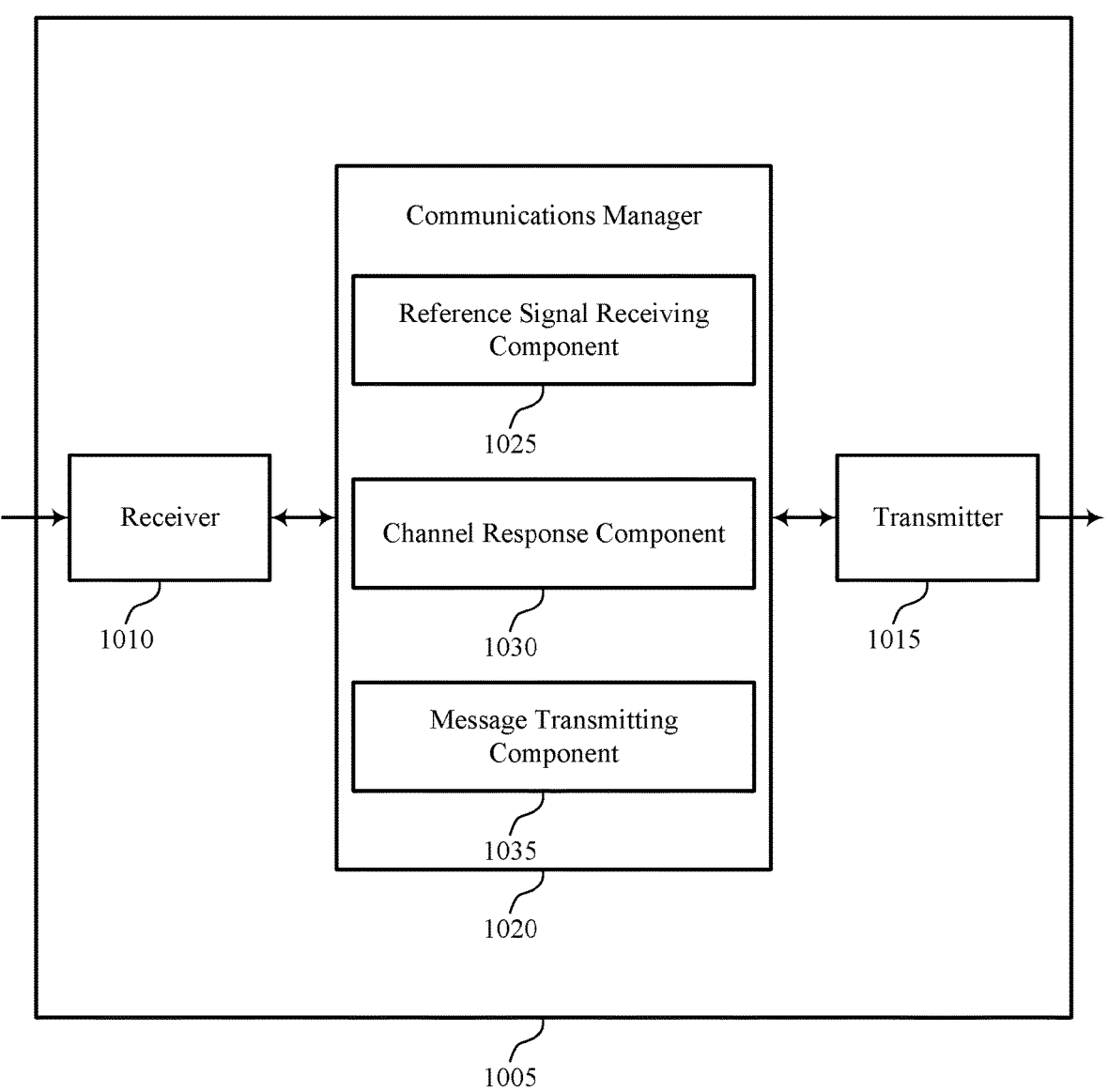

FIG. 10 shows a block diagram 1000 of a device 1005 that supports channel compression for channel feedback reporting in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to channel compression for channel feedback reporting). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to channel compression for channel feedback reporting). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of channel compression for channel feedback reporting as described herein. For example, the communications manager 1020 may include a reference signal receiving component 1025, a channel response component 1030, a message transmitting component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The reference signal receiving component 1025 may be configured as or otherwise support a means for receiving, from a base station, at least one reference signal over a communication channel for wireless communication between the UE and the base station. The channel response component 1030 may be configured as or otherwise support a means for determining a response of the communication channel based on the at least one reference signal received over the communication channel. The message transmitting component 1035 may be configured as or otherwise support a means for transmitting, to the base station, a message indicating a set of channel coefficients corresponding to a 2D model representative of the response, the 2D model including a spatial model and a time domain response of the communication channel.

Figure 11:
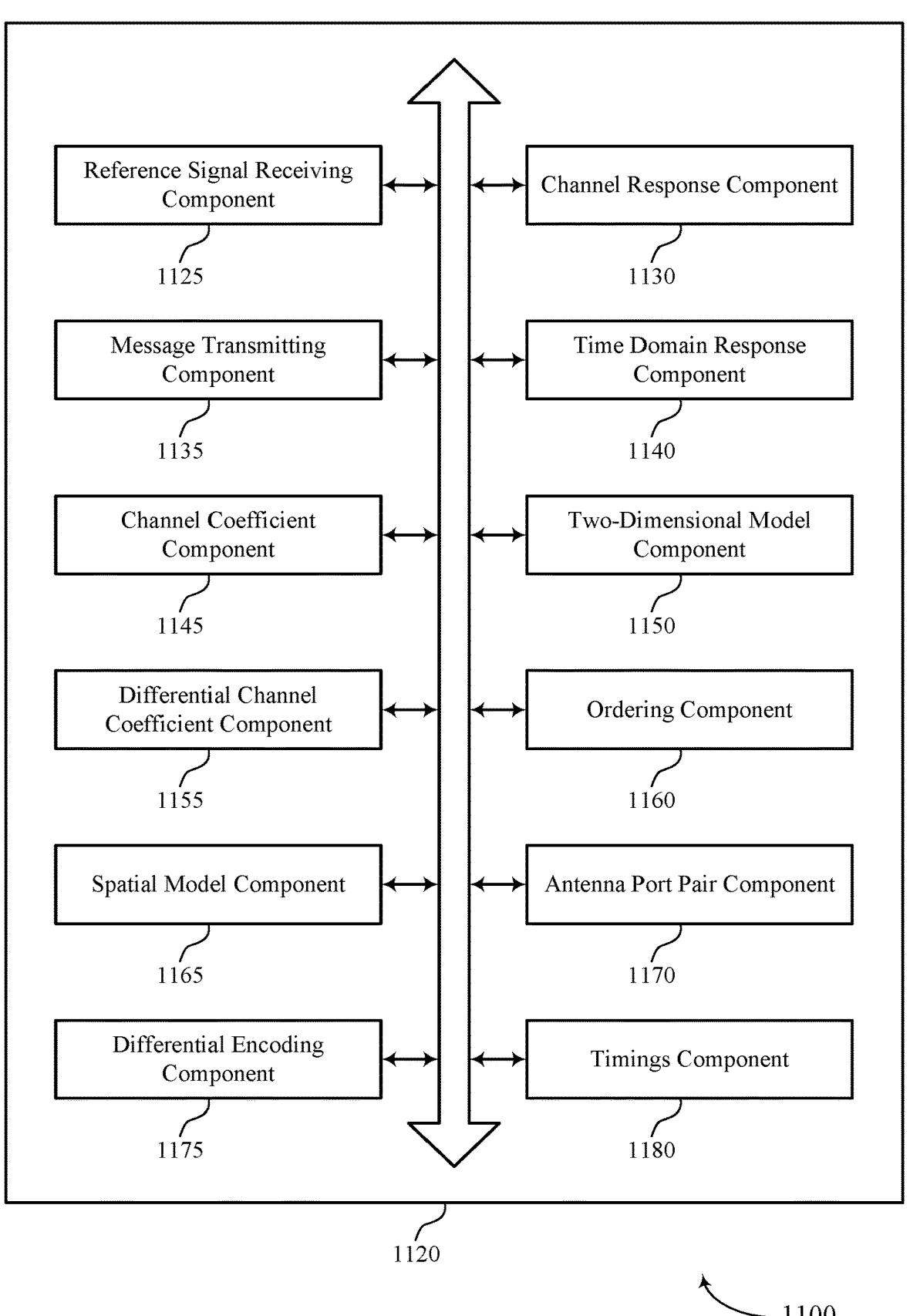
FIG. 11 shows a block diagram of a communications manager that supports channel compression for channel feedback reporting in accordance with aspects of the present disclosure.

FIG. 11 shows a block diagram 1100 of a communications manager 1120 that supports channel compression for channel feedback reporting in accordance with aspects of the present disclosure. The communications manager 1120 may be an example of aspects of a communications manager 920, a communications manager 1020, or both, as described herein. The communications manager 1120, or various components thereof, may be an example of means for performing various aspects of channel compression for channel feedback reporting as described herein. For example, the communications manager 1120 may include a reference signal receiving component 1125, a channel response component 1130, a message transmitting component 1135, a time domain response component 1140, a channel coefficient component 1145, a 2D model component 1150, a differential channel coefficient component 1155, an ordering component 1160, a spatial model component 1165, an antenna port pair component 1170, a differential encoding component 1175, a timings component 1180, or any combination thereof. Each of these components may communicate, directly or indirectly, with one another (e.g., via one or more buses).

The communications manager 1120 may support wireless communication at a UE in accordance with examples as disclosed herein. The reference signal receiving component 1125 may be configured as or otherwise support a means for receiving, from a base station, at least one reference signal over a communication channel for wireless communication between the UE and the base station. The channel response component 1130 may be configured as or otherwise support a means for determining a response of the communication channel based on the at least one reference signal received over the communication channel. The message transmitting component 1135 may be configured as or otherwise support a means for transmitting, to the base station, a message indicating a set of channel coefficients corresponding to a 2D model representative of the response, the 2D model including a spatial model and a time domain response of the communication channel.

In some examples, the channel response component 1130 may be configured as or otherwise support a means for determining, as part of determining the response, a frequency domain response of the communication channel. In some examples, the time domain response component 1140 may be configured as or otherwise support a means for generating the time domain response based on the frequency domain response of the communication channel.

In some examples, the spatial model component 1165 may be configured as or otherwise support a means for generating the spatial model based on the time domain response or the frequency domain response of the communication channel. In some examples, the two-dimensional model is a Kronecker product of a matrix representation of the spatial model and a matrix representation of the time domain response of the communication channel.

In some examples, the channel coefficient component 1145 may be configured as or otherwise support a means for generating the set of channel coefficients based on a MMSE solution between the determined response and the 2D model. In some examples, the set of channel coefficients include a set of quantized coefficients. In some examples, the 2D model component 1150 may be configured as or otherwise support a means for generating the 2D model based on one or more antennas at the UE, one or more antennas at the base station, or both.

In some examples, to support transmitting the message, the message transmitting component 1135 may be configured as or otherwise support a means for transmitting, to the base station, a set of bits indicating the set of channel coefficients via a control channel or a shared channel. In some examples, the message transmitting component 1135 may be configured as or otherwise support a means for transmitting, to the base station, an indication of a number of quantized bits for the message based on a mean squared error or a signal to noise ratio of the communication channel.

In some examples, the channel coefficient component 1145 may be configured as or otherwise support a means for transmitting the set of channel coefficients in a first slot. In some examples, the differential channel coefficient component 1155 may be configured as or otherwise support a means for transmitting a set of differential channel coefficients in a second slot after the first slot, where each differential channel coefficient of the set of differential channel coefficients include a channel coefficient difference relative to a respective channel coefficient of the set of channel coefficients.

In some examples, the channel coefficient component 1145 may be configured as or otherwise support a means for transmitting a second set of channel coefficients in a third slot after the first slot, the second set of channel coefficients different from the set of channel coefficients, where the set of channel coefficients and the second set of channel coefficients are transmitted according to a first periodicity.

In some examples, the differential channel coefficient component 1155 may be configured as or otherwise support a means for transmitting a second set of differential channel coefficients in a fourth slot after the second slot, where each differential channel coefficient of the second set of differential channel coefficients includes a channel coefficient difference relative to a respective channel coefficient of the set of channel coefficients or a respective differential channel coefficient of the set of differential channel coefficients, where the set of differential channel coefficients and the second set of differential channel coefficients are transmitted according to a second periodicity different from the first periodicity.

In some examples, the differential channel coefficient component 1155 may be configured as or otherwise support a means for receiving, from the base station, an indication instructing the UE to enable transmission of the set of differential channel coefficients, where transmitting the set of differential channel coefficients is based on receiving the indication. In some examples, the differential encoding component 1175 may be configured as or otherwise support a means for receiving, from the base station, an indication instructing the UE to use a differential encoding procedure based on a mobility of the UE or a time interval between the message indicating the set of channel coefficients and a previous message indicating a previous set of channel coefficients.

In some examples, the ordering component 1160 may be configured as or otherwise support a means for receiving, from the base station, an indication of an ordering of a set of spatial domain basis functions. In some examples, the spatial model component 1165 may be configured as or otherwise support a means for generating the spatial model based on the ordering of the set of spatial domain basis functions. In some examples, the indication includes a configuration for the spatial model that includes a list of spatial domain basis functions. In some examples, the list of spatial domain basis functions corresponds to the ordering of the set of spatial domain basis functions.

In some examples, the ordering component 1160 may be configured as or otherwise support a means for receiving, from the base station, an indication of an ordering of a set of time domain basis functions. In some examples, the time domain response component 1140 may be configured as or otherwise support a means for generating the time domain response based on the ordering of the set of time domain basis functions. In some examples, the ordering component 1160 may be configured as or otherwise support a means for transmitting an indication of an ordering of a set of spatial domain basis functions, an ordering of a set of time domain basis functions, or both.

In some examples, the channel response component 1130 may be configured as or otherwise support a means for determining, as part of determining the response, the time domain response of the communication channel at a set of multiple timings for each of a set of multiple antenna port pairs. In some examples, the time domain response component 1140 may be configured as or otherwise support a means for selecting a set of time domain basis functions based on determining the time domain response of the communication channel at the set of multiple timings. In some examples, the time domain response component 1140 may be configured as or otherwise support a means for generating the time domain response based on the selected set of time domain basis functions.

In some examples, the time domain response component 1140 may be configured as or otherwise support a means for determining a cumulative energy of the time domain response over the set of multiple antenna port pairs for each timing of the set of multiple timings. In some examples, the timings component 1180 may be configured as or otherwise support a means for selecting a set of timings from the set of multiple timings based on determining the cumulative energy of the time domain response for each timing of the set of multiple timings, where selecting the set of time domain basis functions is based on the selected set of timings.

In some examples, the channel response component 1130 may be configured as or otherwise support a means for evaluating a mean squared error of the determined response and a channel estimation using the selected set of timings, where selecting the set of time domain basis functions is based on evaluating the mean squared error. In some examples, the timings component 1180 may be configured as or otherwise support a means for receiving, from the base station, an indication of a number of timings, where selecting the set of time domain basis functions is based on the indicated number of timings.

In some examples, the timings component 1180 may be configured as or otherwise support a means for transmitting, to the base station, an indication of a number of timings of the set of multiple timings.

In some examples, the antenna port pair component 1170 may be configured as or otherwise support a means for receiving, from the base station, an indication of a set of antenna port pairs. In some examples, the channel response component 1130 may be configured as or otherwise support a means for determining, as part of determining the response, a correlation between each antenna port pair of the set of antenna port pairs, where each antenna port pair is associated with the UE or the base station. In some examples, the antenna port pair component 1170 may be configured as or otherwise support a means for selecting a set of spatial domain basis functions based on determining the correlation between each antenna port pair of the set of antenna port pairs. In some examples, the spatial model component 1165 may be configured as or otherwise support a means for generating the spatial model based on the selected set of spatial domain basis functions.

In some examples, the antenna port pair component 1170 may be configured as or otherwise support a means for selecting the set of spatial domain basis functions based on a lowest determined correlation for an antenna port pair of the set of antenna port pairs. In some examples, the antenna port pair component 1170 may be configured as or otherwise support a means for evaluating a spatial autocorrelation matrix based on determining the correlation between each antenna port pair of the set of antenna port pairs, where selecting the set of spatial domain basis functions is based on the spatial autocorrelation matrix.

Figure 12:
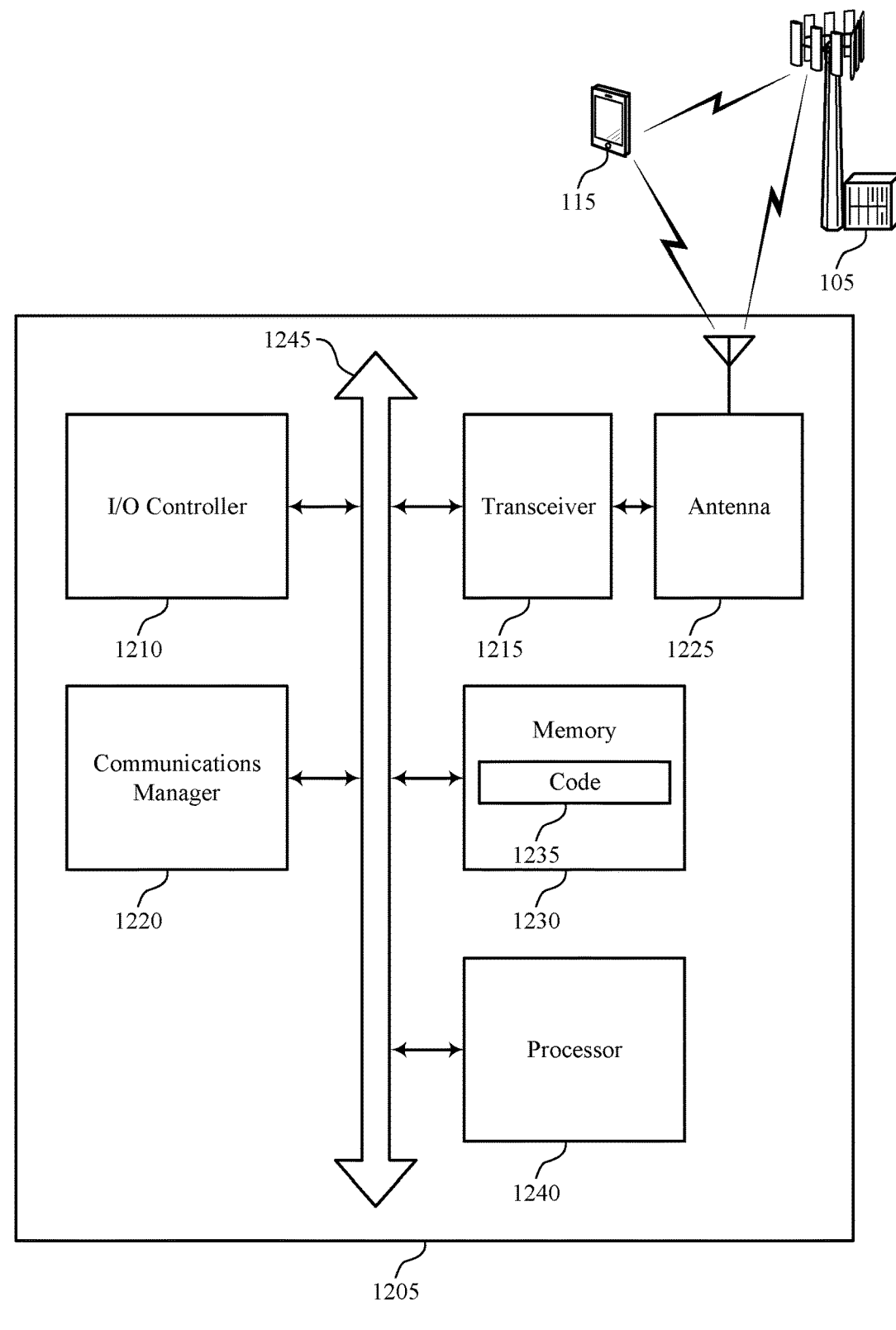
FIG. 12 shows a diagram of a system including a device that supports channel compression for channel feedback reporting in accordance with aspects of the present disclosure.

FIG. 12 shows a diagram of a system 1200 including a device 1205 that supports channel compression for channel feedback reporting in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting channel compression for channel feedback reporting). For example, the device 1205 or a component of the device 1205 may include a processor 1240 and memory 1230 coupled with the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving, from a base station, at least one reference signal over a communication channel for wireless communication between the UE and the base station. The communications manager 1220 may be configured as or otherwise support a means for determining a response of the communication channel based on the at least one reference signal received over the communication channel. The communications manager 1220 may be configured as or otherwise support a means for transmitting, to the base station, a message indicating a set of channel coefficients corresponding to a 2D model representative of the response, the 2D model including a spatial model and a time domain response of the communication channel.

By including or configuring the communications manager 1220 in accordance with examples as described herein, the device 1205 may support techniques for improved communication reliability, reduced latency, improved user experience related to reduced processing, more efficient utilization of communication resources, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of channel compression for channel feedback reporting as described herein, or the processor 1240 and the memory 1230 may be otherwise configured to perform or support such operations.

Figure 13:
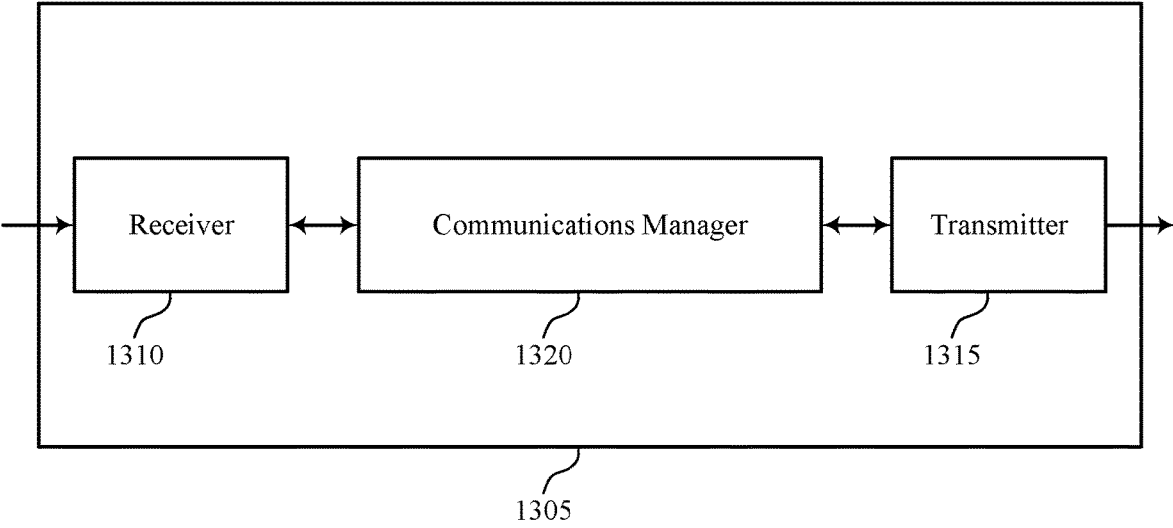
FIGS. 13 and 14 show block diagrams of devices that support channel compression for channel feedback reporting in accordance with aspects of the present disclosure.

FIG. 13 shows a block diagram 1300 of a device 1305 that supports channel compression for channel feedback reporting in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to channel compression for channel feedback reporting). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to channel compression for channel feedback reporting). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of channel compression for channel feedback reporting as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. For example, the communications manager 1320 may be configured as or otherwise support a means for transmitting, to a UE, at least one reference signal over a communication channel for wireless communications between the UE and the base station. The communications manager 1320 may be configured as or otherwise support a means for receiving, from the UE, a message indicating a set of channel coefficients corresponding to a 2D model representative of a response of the communication channel, the 2D model including a spatial model and a time domain response of the communication channel.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reduced processing and more efficient utilization of communication resources.

Figure 14:
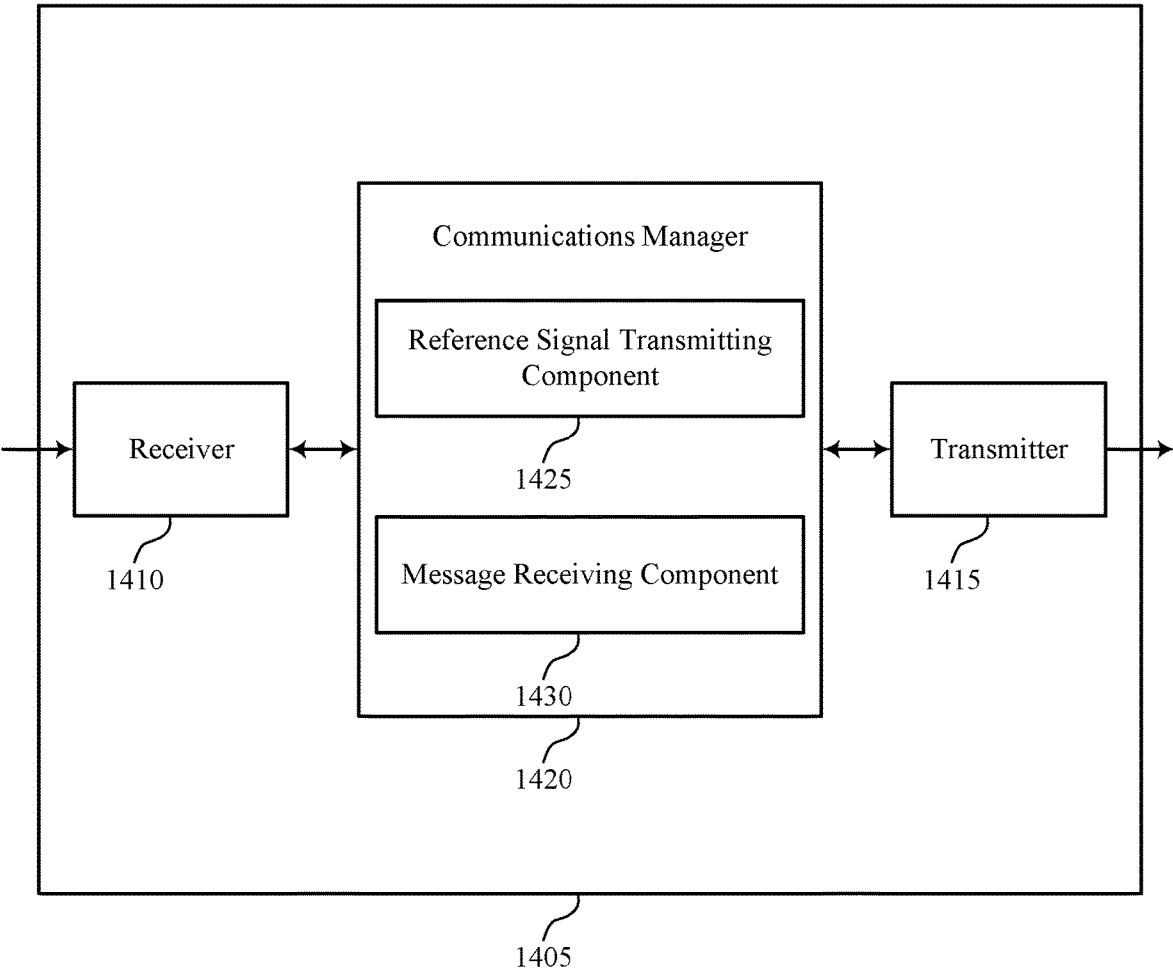

FIG. 14 shows a block diagram 1400 of a device 1405 that supports channel compression for channel feedback reporting in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to channel compression for channel feedback reporting). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to channel compression for channel feedback reporting). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of channel compression for channel feedback reporting as described herein. For example, the communications manager 1420 may include a reference signal transmitting component 1425 a message receiving component 1430, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. The reference signal transmitting component 1425 may be configured as or otherwise support a means for transmitting, to a UE, at least one reference signal over a communication channel for wireless communications between the UE and the base station. The message receiving component 1430 may be configured as or otherwise support a means for receiving, from the UE, a message indicating a set of channel coefficients corresponding to a 2D model representative of a response of the communication channel, the 2D model including a spatial model and a time domain response of the communication channel.

Figure 15:
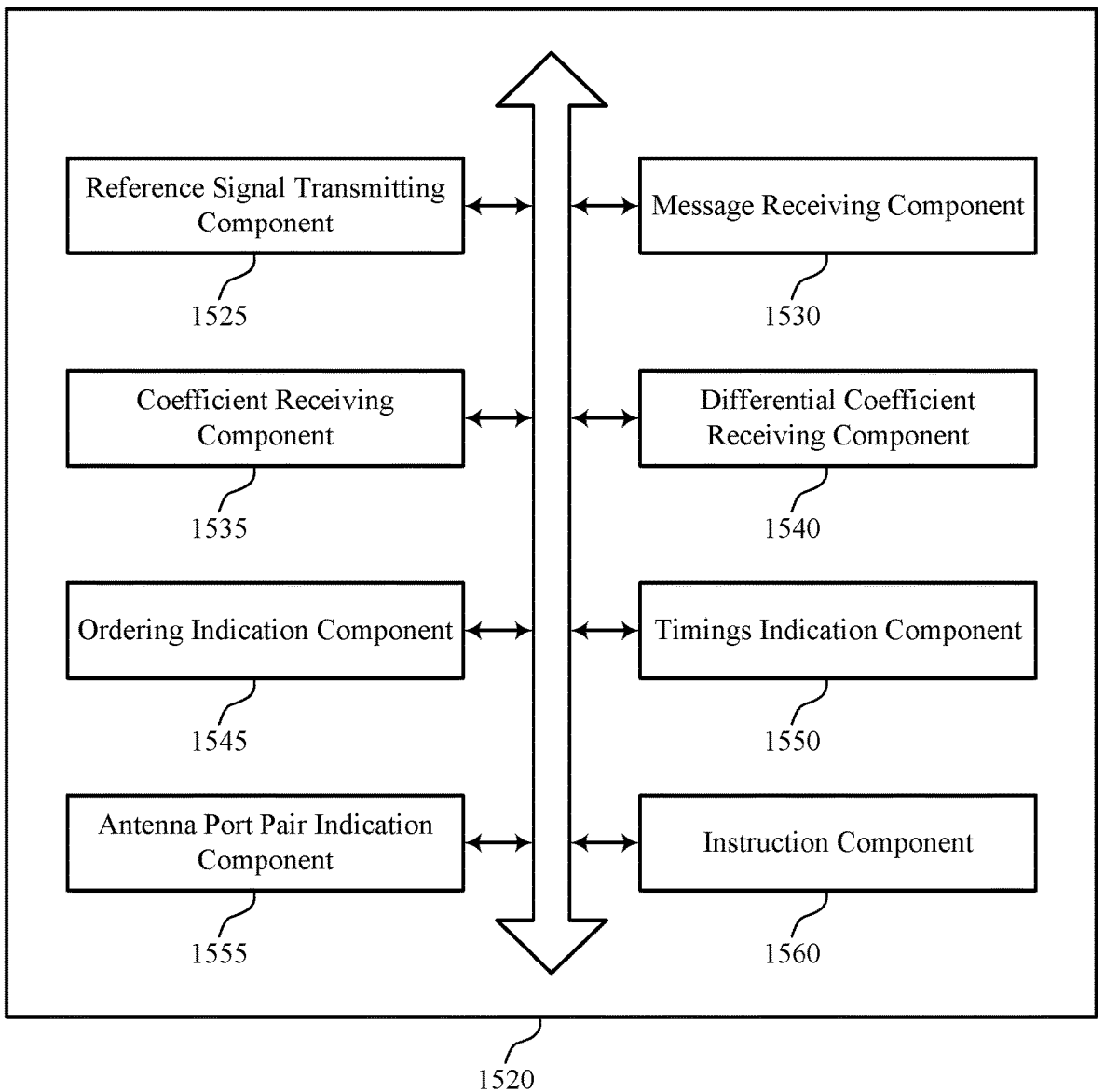
FIG. 15 shows a block diagram of a communications manager that supports channel compression for channel feedback reporting in accordance with aspects of the present disclosure.

FIG. 15 shows a block diagram 1500 of a communications manager 1520 that supports channel compression for channel feedback reporting in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of channel compression for channel feedback reporting as described herein. For example, the communications manager 1520 may include a reference signal transmitting component 1525, a message receiving component 1530, a coefficient receiving component 1535, a differential coefficient receiving component 1540, an ordering indication component 1545, a timings indication component 1550, an antenna port pair indication component 1555, an instruction component 1560, or any combination thereof. Each of these components may communicate, directly or indirectly, with one another (e.g., via one or more buses).

The communications manager 1520 may support wireless communications at a base station in accordance with examples as disclosed herein. The reference signal transmitting component 1525 may be configured as or otherwise support a means for transmitting, to a UE, at least one reference signal over a communication channel for wireless communications between the UE and the base station. The message receiving component 1530 may be configured as or otherwise support a means for receiving, from the UE, a message indicating a set of channel coefficients corresponding to a 2D model representative of a response of the communication channel, the 2D model including a spatial model and a time domain response of the communication channel.

In some examples, the 2D model is a Kronecker product of a matrix representation of the spatial model and a matrix representation of the time domain response of the communication channel. In some examples, the set of channel coefficients include a set of quantized coefficients. In some examples, to support receiving the message, the message receiving component 1530 may be configured as or otherwise support a means for receiving, from the UE, a set of bits indicating the set of channel coefficients via a control channel or a shared channel. In some examples, the message receiving component 1530 may be configured as or otherwise support a means for receiving, from the UE, an indication of a number of quantized bits for the message based on a mean squared error or a signal to noise ratio of the communication channel.

In some examples, the coefficient receiving component 1535 may be configured as or otherwise support a means for receiving the set of channel coefficients in a first slot. In some examples, the differential coefficient receiving component 1540 may be configured as or otherwise support a means for receiving a set of differential channel coefficients in a second slot after the first slot, where each differential channel coefficient of the set of differential channel coefficients include a channel coefficient difference relative to a respective channel coefficient of the set of channel coefficients.

In some examples, the coefficient receiving component 1535 may be configured as or otherwise support a means for receiving a second set of channel coefficients in a third slot after the first slot, the second set of channel coefficients different from the set of channel coefficients, where the set of channel coefficients and the second set of channel coefficients are received according to a first periodicity.

In some examples, the differential coefficient receiving component 1540 may be configured as or otherwise support a means for receiving a second set of differential channel coefficients in a fourth slot after the second slot, where each differential channel coefficient of the second set of differential channel coefficients includes a channel coefficient difference relative to a respective channel coefficient of the set of channel coefficients or a respective differential channel coefficient of the set of differential channel coefficients, where the set of differential channel coefficients and the second set of differential channel coefficients are transmitted according to a second periodicity different from the first periodicity.

In some examples, the instruction component 1560 may be configured as or otherwise support a means for transmitting, to the UE, an indication instructing the UE to enable transmission of the set of differential channel coefficients, where receiving the set of differential channel coefficients is based on transmitting the indication. In some examples, the instruction component 1560 may be configured as or otherwise support a means for transmitting, to the UE, an indication instructing the UE to use a differential encoding procedure based on a mobility of the UE or a time interval between the message indicating the set of channel coefficients and a previous message indicating a previous set of channel coefficients.

In some examples, the ordering indication component 1545 may be configured as or otherwise support a means for transmitting, to the UE, an indication of an ordering of a set of spatial domain basis functions for the 2D model. In some examples, the indication includes a configuration for the spatial model that includes a list of spatial domain basis functions. In some examples, the list of spatial domain basis functions corresponds to the ordering of the set of spatial domain basis functions.

In some examples, the ordering indication component 1545 may be configured as or otherwise support a means for transmitting, to the UE, an indication of an ordering of a set of time domain basis functions for the 2D model. In some examples, the ordering indication component 1545 may be configured as or otherwise support a means for receiving an indication of an ordering of a set of spatial domain basis functions, an ordering of a set of time domain basis functions, or both, for the 2D model.

In some examples, the timings indication component 1550 may be configured as or otherwise support a means for transmitting, to the UE, an indication of a number of timings for the 2D model. In some examples, the timings indication component 1550 may be configured as or otherwise support a means for receiving, from the UE, an indication of a number of timings of a set of multiple timings for the 2D model. In some examples, the antenna port pair indication component 1555 may be configured as or otherwise support a means for transmitting, to the UE, an indication of a set of antenna port pairs, where each antenna port pair is associated with the UE or the base station.

Figure 16:
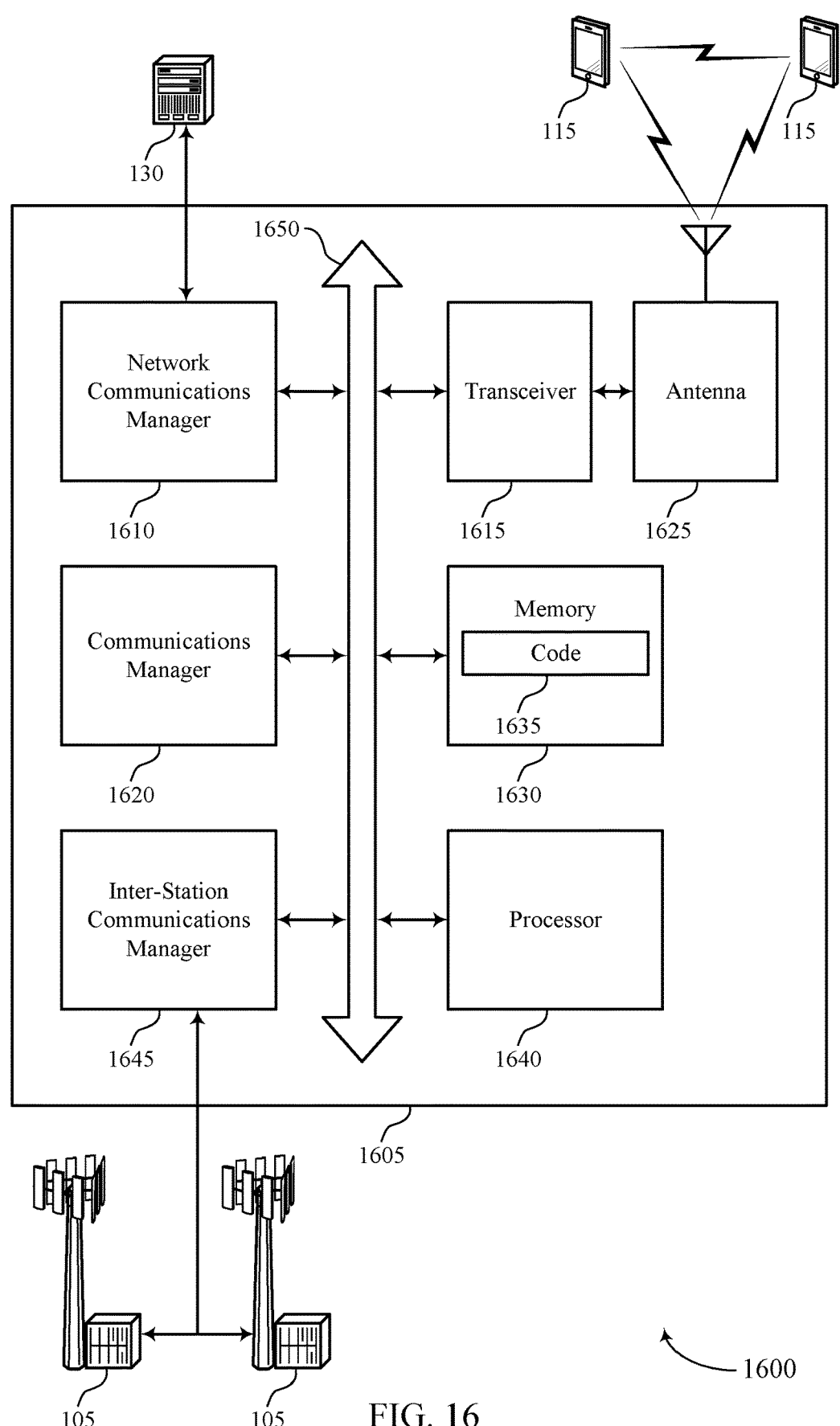
FIG. 16 shows a diagram of a system including a device that supports channel compression for channel feedback reporting in accordance with aspects of the present disclosure.

FIG. 16 shows a diagram of a system 1600 including a device 1605 that supports channel compression for channel feedback reporting in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting channel compression for channel feedback reporting). For example, the device 1605 or a component of the device 1605 may include a processor 1640 and memory 1630 coupled with the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a base station in accordance with examples as disclosed herein. For example, the communications manager 1620 may be configured as or otherwise support a means for transmitting, to a UE, at least one reference signal over a communication channel for wireless communications between the UE and the base station. The communications manager 1620 may be configured as or otherwise support a means for receiving, from the UE, a message indicating a set of channel coefficients corresponding to a 2D model representative of a response of the communication channel, the 2D model including a spatial model and a time domain response of the communication channel.

By including or configuring the communications manager 1620 in accordance with examples as described herein, the device 1605 may support techniques for improved communication reliability, reduced latency, improved user experience related to reduced processing, reduced power consumption, more efficient utilization of communication resources, and improved utilization of processing capability.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of channel compression for channel feedback reporting as described herein, or the processor 1640 and the memory 1630 may be otherwise configured to perform or support such operations.

FIG. 17 shows a flowchart illustrating a method 1700 that supports channel compression for channel feedback reporting in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, at least one reference signal over a communication channel for wireless communication between the UE and the base station. The operations of 1705 may be performed in accordance with examples as disclosed herein. In some examples, aspects of the operations of 1705 may be performed by a reference signal receiving component 1125 as described with reference to FIG. 11.

At 1710, the method may include determining a response of the communication channel based on the at least one reference signal received over the communication channel. The operations of 1710 may be performed in accordance with examples as disclosed herein. In some examples, aspects of the operations of 1710 may be performed by a channel response component 1130 as described with reference to FIG. 11.

At 1715, the method may include transmitting, to the base station, a message indicating a set of channel coefficients corresponding to a 2D model representative of the response, the 2D model including a spatial model and a time domain response of the communication channel. The operations of 1715 may be performed in accordance with examples as disclosed herein. In some examples, aspects of the operations of 1715 may be performed by a message transmitting component 1135 as described with reference to FIG. 11.

FIG. 18 shows a flowchart illustrating a method 1800 that supports channel compression for channel feedback reporting in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, at least one reference signal over a communication channel for wireless communication between the UE and the base station. The operations of 1805 may be performed in accordance with examples as disclosed herein. In some examples, aspects of the operations of 1805 may be performed by a reference signal receiving component 1125 as described with reference to FIG. 11.

At 1810, the method may include determining, as part of determining the response, a frequency domain response of the communication channel. The operations of 1810 may be performed in accordance with examples as disclosed herein. In some examples, aspects of the operations of 1810 may be performed by a channel response component 1130 as described with reference to FIG. 11.

At 1815, the method may include generating the time domain response based on the frequency domain response of the communication channel. The operations of 1815 may be performed in accordance with examples as disclosed herein. In some examples, aspects of the operations of 1815 may be performed by a time domain response component 1140 as described with reference to FIG. 11.

At 1820, the method may include transmitting, to the base station, a message indicating a set of channel coefficients corresponding to a two-dimensional model representative of the response, the two-dimensional model including a spatial model and a time domain response of the communication channel. The operations of 1820 may be performed in accordance with examples as disclosed herein. In some examples, aspects of the operations of 1820 may be performed by a message transmitting component 1135 as described with reference to FIG. 11.

FIG. 19 shows a flowchart illustrating a method 1900 that supports channel compression for channel feedback reporting in accordance with aspects of the present disclosure. The operations of the method 1900 may be implemented by a base station or its components as described herein. For example, the operations of the method 1900 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, at least one reference signal over a communication channel for wireless communications between the UE and the base station. The operations of 1905 may be performed in accordance with examples as disclosed herein. In some examples, aspects of the operations of 1905 may be performed by a reference signal transmitting component 1525 as described with reference to FIG. 15.

At 1910, the method may include receiving, from the UE, a message indicating a set of channel coefficients corresponding to a 2D model representative of a response of the communication channel, the 2D model including a spatial model and a time domain response of the communication channel. The operations of 1910 may be performed in accordance with examples as disclosed herein. In some examples, aspects of the operations of 1910 may be performed by a message receiving component 1530 as described with reference to FIG. 15.

FIG. 20 shows a flowchart illustrating a method 2000 that supports channel compression for channel feedback reporting in accordance with aspects of the present disclosure. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, at least one reference signal over a communication channel for wireless communications between the UE and the base station. The operations of 2005 may be performed in accordance with examples as disclosed herein. In some examples, aspects of the operations of 2005 may be performed by a reference signal transmitting component 1525 as described with reference to FIG. 15.

At 2010, the method may include receiving, from the UE, a message indicating a set of channel coefficients corresponding to a two-dimensional model representative of a response of the communication channel, where the two-dimensional model is a Kronecker product of a matrix representation of a spatial model and a matrix representation of a time domain response of the communication channel. The operations of 2010 may be performed in accordance with examples as disclosed herein. In some examples, aspects of the operations of 2010 may be performed by a message receiving component 1530 as described with reference to FIG. 15.

The following provides an overview of aspects of the present disclosure:

Aspect 1: A method for wireless communication at a UE, comprising: receiving, from a base station, at least one reference signal over a communication channel for wireless communication between the UE and the base station; determining a response of the communication channel based at least in part on the at least one reference signal received over the communication channel; and transmitting, to the base station, a message indicating a set of channel coefficients corresponding to a two-dimensional model representative of the response, the two-dimensional model comprising a spatial model and a time domain response of the communication channel.

Aspect 2: The method of aspect 1, further comprising: determining, as part of determining the response, a frequency domain response of the communication channel; and generating the time domain response based at least in part on the frequency domain response of the communication channel.

Aspect 3: The method of aspect 2, further comprising: generating the spatial model based at least in part on the time domain response or the frequency domain response of the communication channel.

Aspect 4: The method of any of aspects 1 through 3, wherein the two-dimensional model is a Kronecker product of a matrix representation of the spatial model and a matrix representation of the time domain response of the communication channel.

Aspect 5: The method of any of aspects 1 through 4, further comprising: generating the set of channel coefficients based at least in part on a minimum mean square error solution between the determined response and the two-dimensional model.

Aspect 6: The method of any of aspects 1 through 5, wherein the set of channel coefficients comprise a set of quantized coefficients.

Aspect 7: The method of any of aspects 1 through 6, further comprising: generating the two-dimensional model based at least in part on one or more antennas at the UE, one or more antennas at the base station, or both.

Aspect 8: The method of any of aspects 1 through 7, wherein transmitting the message comprises: transmitting, to the base station, a set of bits indicating the set of channel coefficients via a control channel or a shared channel.

Aspect 9: The method of aspect 8, further comprising: transmitting, to the base station, an indication of a number of quantized bits for the message based at least in part on a mean squared error or a signal to noise ratio of the communication channel.

Aspect 10: The method of any of aspects 1 through 9, further comprising: transmitting the set of channel coefficients in a first slot; and transmitting a set of differential channel coefficients in a second slot after the first slot, wherein each differential channel coefficient of the set of differential channel coefficients comprise a channel coefficient difference relative to a respective channel coefficient of the set of channel coefficients.

Aspect 11: The method of aspect 10, further comprising: transmitting a second set of channel coefficients in a third slot after the first slot, the second set of channel coefficients different from the set of channel coefficients, wherein the set of channel coefficients and the second set of channel coefficients are transmitted according to a first periodicity.

Aspect 12: The method of aspect 11, further comprising: transmitting a second set of differential channel coefficients in a fourth slot after the second slot, wherein each differential channel coefficient of the second set of differential channel coefficients comprises a channel coefficient difference relative to a respective channel coefficient of the set of channel coefficients or a respective differential channel coefficient of the set of differential channel coefficients, wherein the set of differential channel coefficients and the second set of differential channel coefficients are transmitted according to a second periodicity different from the first periodicity.

Aspect 13: The method of any of aspects 10 through 12, further comprising: receiving, from the base station, an indication instructing the UE to enable transmission of the set of differential channel coefficients, wherein transmitting the set of differential channel coefficients is based at least in part on receiving the indication.

Aspect 14: The method of any of aspects 10 through 13, further comprising: receiving, from the base station, an indication instructing the UE to use a differential encoding procedure based at least in part on a mobility of the UE or a time interval between the message indicating the set of channel coefficients and a previous message indicating a previous set of channel coefficients.

Aspect 15: The method of any of aspects 1 through 14, further comprising: receiving, from the base station, an indication of an ordering of a set of spatial domain basis functions; and generating the spatial model based at least in part on the ordering of the set of spatial domain basis functions.

Aspect 16: The method of aspect 15, wherein the indication comprises a configuration for the spatial model that includes a list of spatial domain basis functions; and the list of spatial domain basis functions corresponds to the ordering of the set of spatial domain basis functions.

Aspect 17: The method of any of aspects 1 through 16, further comprising: receiving, from the base station, an indication of an ordering of a set of time domain basis functions; and generating the time domain response based at least in part on the ordering of the set of time domain basis functions.

Aspect 18: The method of any of aspects 1 through 14, further comprising: transmitting an indication of an ordering of a set of spatial domain basis functions, an ordering of a set of time domain basis functions, or both.

Aspect 19: The method of any of aspects 1 through 18, further comprising: determining, as part of determining the response, the time domain response of the communication channel at a plurality of timings for each of a plurality of antenna port pairs; selecting a set of time domain basis functions based at least in part on determining the time domain response of the communication channel at the plurality of timings; and generating the time domain response based at least in part on the selected set of time domain basis functions.

Aspect 20: The method of aspect 19, further comprising: determining a cumulative energy of the time domain response over the plurality of antenna port pairs for each timing of the plurality of timings; and selecting a set of timings from the plurality of timings based at least in part on determining the cumulative energy of the time domain response for each timing of the plurality of timings, wherein selecting the set of time domain basis functions is based at least in part on the selected set of timings.

Aspect 21: The method of aspect 20, further comprising: evaluating a mean squared error of the determined response and a channel estimation using the selected set of timings, wherein selecting the set of time domain basis functions is based at least in part on evaluating the mean squared error.

Aspect 22: The method of any of aspects 19 through 21, further comprising: receiving, from the base station, an indication of a number of timings, wherein selecting the set of time domain basis functions is based at least in part on the indicated number of timings.

Aspect 23: The method of any of aspects 19 through 21, further comprising: transmitting, to the base station, an indication of a number of timings of the plurality of timings.

Aspect 24: The method of any of aspects 1 through 23, further comprising: receiving, from the base station, an indication of a set of antenna port pairs; determining, as part of determining the response, a correlation between each antenna port pair of the set of antenna port pairs, wherein each antenna port pair is associated with the UE or the base station; selecting a set of spatial domain basis functions based at least in part on determining the correlation between each antenna port pair of the set of antenna port pairs; and generating the spatial model based at least in part on the selected set of spatial domain basis functions.

Aspect 25: The method of aspect 24, further comprising: selecting the set of spatial domain basis functions based at least in part on a lowest determined correlation for an antenna port pair of the set of antenna port pairs.

Aspect 26: The method of any of aspects 24 through 25, further comprising: evaluating a spatial autocorrelation matrix based at least in part on determining the correlation between each antenna port pair of the set of antenna port pairs, wherein selecting the set of spatial domain basis functions is based at least in part on the spatial autocorrelation matrix.

Aspect 27: A method for wireless communications at a base station, comprising: transmitting, to a UE, at least one reference signal over a communication channel for wireless communications between the UE and the base station; and receiving, from the UE, a message indicating a set of channel coefficients corresponding to a two-dimensional model representative of a response of the communication channel, the two-dimensional model comprising a spatial model and a time domain response of the communication channel.

Aspect 28: The method of aspect 27, wherein the two-dimensional model is a Kronecker product of a matrix representation of the spatial model and a matrix representation of the time domain response of the communication channel.

Aspect 29: The method of any of aspects 27 through 28, wherein the set of channel coefficients comprise a set of quantized coefficients.

Aspect 30: The method of any of aspects 27 through 29, wherein receiving the message comprises: receiving, from the UE, a set of bits indicating the set of channel coefficients via a control channel or a shared channel.

Aspect 31: The method of aspect 30, further comprising: receiving, from the UE, an indication of a number of quantized bits for the message based at least in part on a mean squared error or a signal to noise ratio of the communication channel.

Aspect 32: The method of any of aspects 27 through 31, further comprising: receiving the set of channel coefficients in a first slot; and receiving a set of differential channel coefficients in a second slot after the first slot, wherein each differential channel coefficient of the set of differential channel coefficients comprise a channel coefficient difference relative to a respective channel coefficient of the set of channel coefficients.

Aspect 33: The method of aspect 32, further comprising: receiving a second set of channel coefficients in a third slot after the first slot, the second set of channel coefficients different from the set of channel coefficients, wherein the set of channel coefficients and the second set of channel coefficients are received according to a first periodicity.

Aspect 34: The method of aspect 33, further comprising: receiving a second set of differential channel coefficients in a fourth slot after the second slot, wherein each differential channel coefficient of the second set of differential channel coefficients comprises a channel coefficient difference relative to a respective channel coefficient of the set of channel coefficients or a respective differential channel coefficient of the set of differential channel coefficients, wherein the set of differential channel coefficients and the second set of differential channel coefficients are transmitted according to a second periodicity different from the first periodicity.

Aspect 35: The method of any of aspects 32 through 34, further comprising: transmitting, to the UE, an indication instructing the UE to enable transmission of the set of differential channel coefficients, wherein receiving the set of differential channel coefficients is based at least in part on transmitting the indication.

Aspect 36: The method of any of aspects 32 through 35, further comprising: transmitting, to the UE, an indication instructing the UE to use a differential encoding procedure based at least in part on a mobility of the UE or a time interval between the message indicating the set of channel coefficients and a previous message indicating a previous set of channel coefficients.

Aspect 37: The method of any of aspects 27 through 36, further comprising: transmitting, to the UE, an indication of an ordering of a set of spatial domain basis functions for the two-dimensional model.

Aspect 38: The method of aspect 37, wherein the indication comprises a configuration for the spatial model that includes a list of spatial domain basis functions; and the list of spatial domain basis functions corresponds to the ordering of the set of spatial domain basis functions.

Aspect 39: The method of any of aspects 27 through 38, further comprising: transmitting, to the UE, an indication of an ordering of a set of time domain basis functions for the two-dimensional model.

Aspect 40: The method of any of aspects 27 through 35, further comprising: receiving an indication of an ordering of a set of spatial domain basis functions, an ordering of a set of time domain basis functions, or both, for the two-dimensional model.

Aspect 41: The method of any of aspects 27 through 40, further comprising: transmitting, to the UE, an indication of a number of timings for the two-dimensional model.

Aspect 42: The method of any of aspects 27 through 40, further comprising: receiving, from the UE, an indication of a number of timings of a plurality of timings for the two-dimensional model.

Aspect 43: The method of any of aspects 27 through 42, further comprising: transmitting, to the UE, an indication of a set of antenna port pairs, wherein each antenna port pair is associated with the UE or the base station.

Aspect 44: An apparatus for wireless communication at a UE, comprising a processor; memory coupled with the processor; and instructions stored in the memory and executable by the processor to cause the apparatus to perform a method of any of aspects 1 through 26.

Aspect 45: An apparatus for wireless communication at a UE, comprising at least one means for performing a method of any of aspects 1 through 26.

Aspect 46: A non-transitory computer-readable medium storing code for wireless communication at a UE, the code comprising instructions executable by a processor to perform a method of any of aspects 1 through 26.

Aspect 47: An apparatus for wireless communications at a base station, comprising a processor; memory coupled with the processor; and instructions stored in the memory and executable by the processor to cause the apparatus to perform a method of any of aspects 27 through 43.

Aspect 48: An apparatus for wireless communications at a base station, comprising at least one means for performing a method of any of aspects 27 through 43.

Aspect 49: A non-transitory computer-readable medium storing code for wireless communications at a base station, the code comprising instructions executable by a processor to perform a method of any of aspects 27 through 43.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a base station, at least one reference signal over a communication channel for wireless communication between the UE and the base station; and transmitting, to the base station, a message indicating a set of channel coefficients corresponding to a two-dimensional model representative of a response of the communication channel, the response of the communication channel based at least in part on the at least one reference signal received over the communication channel, wherein the two-dimensional model is a Kronecker product of a matrix representation of a spatial model and a matrix representation of a time domain response of the communication channel, wherein the spatial model is based at least in part on a set of spatial domain basis functions, wherein the set of spatial domain basis functions is based at least in part on a correlation between each antenna port pair of a set of antenna port pairs, and wherein the correlation between each antenna port pair of the set of antenna port pairs is based at least in part on the response.

2. The method of claim 1, further comprising:

generating the time domain response based at least in part on a frequency domain response of the communication channel, the frequency domain response of the communication channel based at least in part on the response.

3. The method of claim 2, further comprising:

generating the spatial model based at least in part on the time domain response or the frequency domain response of the communication channel.

4. The method of claim 1, further comprising:

generating the set of channel coefficients based at least in part on a minimum mean square error solution between the response and the two-dimensional model.

5. The method of claim 1, wherein the set of channel coefficients comprise a set of quantized coefficients.

6. The method of claim 1, further comprising:

generating the two-dimensional model based at least in part on one or more antennas at the UE, one or more antennas at the base station, or both.

7. The method of claim 1, wherein transmitting the message comprises:

transmitting, to the base station, a set of bits indicating the set of channel coefficients via a control channel or a shared channel.

8. The method of claim 7, further comprising:

transmitting, to the base station, an indication of a number of quantized bits for the message based at least in part on a mean squared error or a signal to noise ratio of the communication channel.

9. The method of claim 1, further comprising:

transmitting the set of channel coefficients in a first slot; and transmitting a set of differential channel coefficients in a second slot after the first slot, wherein each differential channel coefficient of the set of differential channel coefficients comprise a channel coefficient difference relative to a respective channel coefficient of the set of channel coefficients.

10. The method of claim 9, further comprising:

transmitting a second set of channel coefficients in a third slot after the first slot, the second set of channel coefficients different from the set of channel coefficients, wherein the set of channel coefficients and the second set of channel coefficients are transmitted according to a first periodicity.

11. The method of claim 10, further comprising:

transmitting a second set of differential channel coefficients in a fourth slot after the second slot, wherein each differential channel coefficient of the second set of differential channel coefficients comprises a channel coefficient difference relative to a respective channel coefficient of the set of channel coefficients or a respective differential channel coefficient of the set of differential channel coefficients, wherein the set of differential channel coefficients and the second set of differential channel coefficients are transmitted according to a second periodicity different from the first periodicity.

12. The method of claim 9, further comprising:

receiving, from the base station, an indication instructing the UE to enable transmission of the set of differential channel coefficients, wherein transmitting the set of differential channel coefficients is based at least in part on receiving the indication.

13. The method of claim 9, further comprising:

receiving, from the base station, an indication instructing the UE to use a differential encoding procedure based at least in part on a mobility of the UE or a time interval between the message indicating the set of channel coefficients and a previous message indicating a previous set of channel coefficients.

14. The method of claim 1, further comprising:

receiving, from the base station, an indication of an ordering of the set of spatial domain basis functions; and generating the spatial model based at least in part on the ordering of the set of spatial domain basis functions.

15. The method of claim 14, wherein:

the indication comprises a configuration for the spatial model that includes a list of spatial domain basis functions; and the list of spatial domain basis functions corresponds to the ordering of the set of spatial domain basis functions.

16. The method of claim 1, further comprising:

receiving, from the base station, an indication of an ordering of a set of time domain basis functions; and generating the time domain response based at least in part on the ordering of the set of time domain basis functions.

17. The method of claim 1, further comprising:

transmitting an indication of an ordering of the set of spatial domain basis functions, an ordering of a set of time domain basis functions, or both.

18. The method of claim 1, further comprising:

selecting a set of time domain basis functions based at least in part on a time domain response of the communication channel at a plurality of timings, the time domain response of the communication channel at the plurality of timings for each antenna port pair of the set of antenna port pairs based at least in part on the response; and generating the time domain response based at least in part on the selected set of time domain basis functions.

19. The method of claim 18, further comprising:

selecting a set of timings from the plurality of timings based at least in part on a cumulative energy of the time domain response over the set of antenna port pairs for each timing of the plurality of timings, wherein selecting the set of time domain basis functions is based at least in part on the selected set of timings.

20. The method of claim 19, further comprising:

evaluating a mean squared error of the response and a channel estimation using the selected set of timings, wherein selecting the set of time domain basis functions is based at least in part on evaluating the mean squared error.

21. The method of claim 18, further comprising:

receiving, from the base station, an indication of a number of timings, wherein selecting the set of time domain basis functions is based at least in part on the indicated number of timings.

22. The method of claim 18, further comprising:

transmitting, to the base station, an indication of a number of timings of the plurality of timings.

23. The method of claim 1, further comprising:

receiving, from the base station, an indication of the set of antenna port pairs;

wherein each antenna port pair is associated with the UE or the base station; and generating the spatial model based at least in part on the set of spatial domain basis functions.

24. The method of claim 23, further comprising:

selecting the set of spatial domain basis functions based at least in part on a lowest determined correlation for an antenna port pair of the set of antenna port pairs.

25. The method of claim 23, further comprising:

evaluating a spatial autocorrelation matrix based at least in part on the correlation between each antenna port pair of the set of antenna port pairs, wherein selecting the set of spatial domain basis functions is based at least in part on the spatial autocorrelation matrix.

26. A method for wireless communications at a base station, comprising:

transmitting, to a user equipment (UE), at least one reference signal over a communication channel for wireless communications between the UE and the base station; and receiving, from the UE, a message indicating a set of channel coefficients corresponding to a two-dimensional model representative of a response of the communication channel, wherein the two-dimensional model is a Kronecker product of a matrix representation of a spatial model and a matrix representation of a time domain response of the communication channel, wherein the spatial model is based at least in part on a set of spatial domain basis functions, wherein the set of spatial domain basis functions is based at least in part on a correlation between each antenna port pair of a set of antenna port pairs, and wherein the correlation between each antenna port pair of the set of antenna port pairs is based at least in part on the response.

27. The method of claim 26, wherein the set of channel coefficients comprise a set of quantized coefficients.

28. The method of claim 26, wherein receiving the message comprises:

receiving, from the UE, a set of bits indicating the set of channel coefficients via a control channel or a shared channel.

29. The method of claim 28, further comprising:

receiving, from the UE, an indication of a number of quantized bits for the message based at least in part on a mean squared error or a signal to noise ratio of the communication channel.

30. The method of claim 26, further comprising:

receiving the set of channel coefficients in a first slot; and receiving a set of differential channel coefficients in a second slot after the first slot, wherein each differential channel coefficient of the set of differential channel coefficients comprise a channel coefficient difference relative to a respective channel coefficient of the set of channel coefficients.

31. The method of claim 30, further comprising:

receiving a second set of channel coefficients in a third slot after the first slot, the second set of channel coefficients different from the set of channel coefficients, wherein the set of channel coefficients and the second set of channel coefficients are received according to a first periodicity.

32. The method of claim 31, further comprising:

receiving a second set of differential channel coefficients in a fourth slot after the second slot, wherein each differential channel coefficient of the second set of differential channel coefficients comprises a channel coefficient difference relative to a respective channel coefficient of the set of channel coefficients or a respective differential channel coefficient of the set of differential channel coefficients, wherein the set of differential channel coefficients and the second set of differential channel coefficients are transmitted according to a second periodicity different from the first periodicity.

33. The method of claim 30, further comprising:

transmitting, to the UE, an indication instructing the UE to enable transmission of the set of differential channel coefficients, wherein receiving the set of differential channel coefficients is based at least in part on transmitting the indication.

34. The method of claim 30, further comprising:

transmitting, to the UE, an indication instructing the UE to use a differential encoding procedure based at least in part on a mobility of the UE or a time interval between the message indicating the set of channel coefficients and a previous message indicating a previous set of channel coefficients.

35. The method of claim 26, further comprising:

transmitting, to the UE, an indication of an ordering of the set of spatial domain basis functions for the two-dimensional model.

36. The method of claim 35, wherein:

the indication comprises a configuration for the spatial model that includes a list of spatial domain basis functions; and the list of spatial domain basis functions corresponds to the ordering of the set of spatial domain basis functions.

37. The method of claim 26, further comprising:

transmitting, to the UE, an indication of an ordering of a set of time domain basis functions for the two-dimensional model.

38. The method of claim 26, further comprising:

receiving an indication of an ordering of the set of spatial domain basis functions, an ordering of a set of time domain basis functions, or both, for the two-dimensional model.

39. The method of claim 26, further comprising:

transmitting, to the UE, an indication of a number of timings for the two-dimensional model.

40. The method of claim 26, further comprising:

receiving, from the UE, an indication of a number of timings of a plurality of timings for the two-dimensional model.

41. The method of claim 26, further comprising:

transmitting, to the UE, an indication of the set of antenna port pairs, wherein each antenna port pair is associated with the UE or the base station.

42. An apparatus for wireless communication at a user equipment (UE), comprising:

one or more processors; and instructions stored in one or more memories and executable by the one or more processors to cause the apparatus to:

receive, from a base station, at least one reference signal over a communication channel for wireless communications between the UE and the base station; and transmit, to the base station, a message indicating a set of channel coefficients corresponding to a two-dimensional model representative of a response of the communication channel, the response of the communication channel based at least in part on the at least one reference signal received over the communication channel, wherein the two-dimensional model is a Kronecker product of a matrix representation of a spatial model and a matrix representation of a time domain response of the communication channel, wherein the spatial model is based at least in part on a set of spatial domain basis functions, wherein the set of spatial domain basis functions is based at least in part on a correlation between each antenna port pair of a set of antenna port pairs, and wherein the correlation between each antenna port pair of the set of antenna port pairs is based at least in part on the response.

43. The apparatus of claim 42, wherein the instructions are further executable by the one or more processors to cause the apparatus to:

generate the time domain response based at least in part on a frequency domain response of the communication channel, the frequency domain response of the communication channel based at least in part on the response.

44. The apparatus of claim 43, wherein the instructions are further executable by the one or more processors to cause the apparatus to:

generate the spatial model based at least in part on the time domain response or the frequency domain response of the communication channel.

45. The apparatus of claim 42, wherein the instructions are further executable by the one or more processors to cause the apparatus to:

generate the set of channel coefficients based at least in part on a minimum mean square error solution between the response and the two-dimensional model.

46. The apparatus of claim 42, wherein the set of channel coefficients comprise a set of quantized coefficients.

47. The apparatus of claim 42, wherein the instructions are further executable by the one or more processors to cause the apparatus to:

generate the two-dimensional model based at least in part on one or more antennas at the UE, one or more antennas at the base station, or both.

48. The apparatus of claim 42, wherein the instructions to transmit the message are executable by the one or more processors to cause the apparatus to:

transmit, to the base station, a set of bits indicating the set of channel coefficients via a control channel or a shared channel.

49. The apparatus of claim 48, wherein the instructions are further executable by the one or more processors to cause the apparatus to:

transmit, to the base station, an indication of a number of quantized bits for the message based at least in part on a mean squared error or a signal to noise ratio of the communication channel.

50. The apparatus of claim 42, wherein the instructions are further executable by the one or more processors to cause the apparatus to:

transmit the set of channel coefficients in a first slot; and
transmit a set of differential channel coefficients in a second slot after the first slot, wherein each differential channel coefficient of the set of differential channel coefficients comprise a channel coefficient difference relative to a respective channel coefficient of the set of channel coefficients.

51. The apparatus of claim 50, wherein the instructions are further executable by the one or more processors to cause the apparatus to:

transmit a second set of channel coefficients in a third slot after the first slot, the second set of channel coefficients different from the set of channel coefficients, wherein the set of channel coefficients and the second set of channel coefficients are transmitted according to a first periodicity.

52. The apparatus of claim 51, wherein the instructions are further executable by the one or more processors to cause the apparatus to:

transmit a second set of differential channel coefficients in a fourth slot after the second slot, wherein each differential channel coefficient of the second set of differential channel coefficients comprises a channel coefficient difference relative to a respective channel coefficient of the set of channel coefficients or a respective differential channel coefficient of the set of differential channel coefficients, wherein the set of differential channel coefficients and the second set of differential channel coefficients are transmitted according to a second periodicity different from the first periodicity.

53. The apparatus of claim 50, wherein the instructions are further executable by the one or more processors to cause the apparatus to:

receive, from the base station, an indication instructing the UE to enable transmission of the set of differential channel coefficients, wherein transmitting the set of differential channel coefficients is based at least in part on receiving the indication.

54. The apparatus of claim 50, wherein the instructions are further executable by the one or more processors to cause the apparatus to:

receive, from the base station, an indication instructing the UE to use a differential encoding procedure based at least in part on a mobility of the UE or a time interval between the message indicating the set of channel coefficients and a previous message indicating a previous set of channel coefficients.

55. The apparatus of claim 42, wherein the instructions are further executable by the one or more processors to cause the apparatus to:

receive, from the base station, an indication of an ordering of the set of spatial domain basis functions; and
generate the spatial model based at least in part on the ordering of the set of spatial domain basis functions.

56. The apparatus of claim 55, wherein:

the indication comprises a configuration for the spatial model that includes a list of spatial domain basis functions; and
the list of spatial domain basis functions corresponds to the ordering of the set of spatial domain basis functions.

57. The apparatus of claim 42, wherein the instructions are further executable by the one or more processors to cause the apparatus to:

receive, from the base station, an indication of an ordering of a set of time domain basis functions; and
generate the time domain response based at least in part on the ordering of the set of time domain basis functions.

58. The apparatus of claim 42 wherein the instructions are further executable by the one or more processors to cause the apparatus to:

transmit an indication of an ordering of the set of spatial domain basis functions, an ordering of a set of time domain basis functions, or both.

59. The apparatus of claim 42, wherein the instructions are further executable by the one or more processors to cause the apparatus to s:

select a set of time domain basis functions based at least in part on a time domain response of the communication channel at a plurality of timings, the time domain response of the communication channel at the plurality of timings for each antenna port pair of the set of antenna port pairs based at least in part on the response; and generate the time domain response based at least in part on the selected set of time domain basis functions.

60. The apparatus of claim 59, wherein the instructions are further executable by the one or more processors to cause the apparatus to:

select a set of timings from the plurality of timings based at least in part on a cumulative energy of the time domain response over the set of antenna port pairs for each timing of the plurality of timings, wherein selecting the set of time domain basis functions is based at least in part on the selected set of timings.

61. The apparatus of claim 60, wherein the instructions are further executable by the one or more processors to cause the apparatus to:

evaluate a mean squared error of the response and a channel estimation using the selected set of timings, wherein selecting the set of time domain basis functions is based at least in part on evaluating the mean squared error.

62. The apparatus of claim 59, wherein the instructions are further executable by the one or more processors to cause the apparatus to:

receive, from the base station, an indication of a number of timings, wherein selecting the set of time domain basis functions is based at least in part on the indicated number of timings.

63. The apparatus of claim 59, wherein the instructions are further executable by the one or more processors to cause the apparatus to:

transmit, to the base station, an indication of a number of timings of the plurality of timings.

64. The apparatus of claim 42, wherein the instructions are further executable by the one or more processors to cause the apparatus to:

receive, from the base station, an indication of the set of antenna port pairs;

wherein each antenna port pair is associated with the UE or the base station; and generate the spatial model based at least in part on the set of spatial domain basis functions.

65. The apparatus of claim 64, wherein the instructions are further executable by the one or more processors to cause the apparatus to:

select the set of spatial domain basis functions based at least in part on a lowest determined correlation for an antenna port pair of the set of antenna port pairs.

66. The apparatus of claim 64, wherein the instructions are further executable by the one or more processors to cause the apparatus to:

evaluate a spatial autocorrelation matrix based at least in part on the correlation between each antenna port pair of the set of antenna port pairs, wherein selecting the set of spatial domain basis functions is based at least in part on the spatial autocorrelation matrix.

67. An apparatus for wireless communications at a base station, comprising:

one or more processors; and instructions stored in one or more memories and executable by the one or more processors to cause the apparatus to:

transmit, to a user equipment (UE), at least one reference signal over a communication channel for wireless communications between the UE and the base station; and receive, from the UE, a message indicating a set of channel coefficients corresponding to a two-dimensional model representative of a response of the communication channel, wherein the two-dimensional model is a Kronecker product of a matrix representation of a spatial model and a matrix representation of a time domain response of the communication channel, wherein the spatial model is based at least in part on a set of spatial domain basis functions, wherein the set of spatial domain basis functions is based at least in part on a correlation between each antenna port pair of a set of antenna port pairs, and wherein the correlation between each antenna port pair of the set of antenna port pairs is based at least in part on the response.

68. The apparatus of claim 67, wherein the set of channel coefficients comprise a set of quantized coefficients.

69. The apparatus of claim 67, wherein the instructions are further executable by the one or more processors to cause the apparatus to:

receive, from the UE, a set of bits indicating the set of channel coefficients via a control channel or a shared channel.

70. The apparatus of claim 69, wherein the instructions to receive the message are further executable by the one or more processors to cause the apparatus to s:

receive, from the UE, an indication of a number of quantized bits for the message based at least in part on a mean squared error or a signal to noise ratio of the communication channel.

71. The apparatus of claim 67, wherein the instructions are further executable by the one or more processors to cause the apparatus to:

receive the set of channel coefficients in a first slot; and receive a set of differential channel coefficients in a second slot after the first slot, wherein each differential channel coefficient of the set of differential channel coefficients comprise a channel coefficient difference relative to a respective channel coefficient of the set of channel coefficients.

72. The apparatus of claim 71, wherein the instructions are further executable by the one or more processors to cause the apparatus to:

receive a second set of channel coefficients in a third slot after the first slot, the second set of channel coefficients different from the set of channel coefficients, wherein the set of channel coefficients and the second set of channel coefficients are received according to a first periodicity.

73. The apparatus of claim 72, wherein the instructions are further executable by the one or more processors to cause the apparatus to:

receive a second set of differential channel coefficients in a fourth slot after the second slot, wherein each differential channel coefficient of the second set of differential channel coefficients comprises a channel coefficient difference relative to a respective channel coefficient of the set of channel coefficients or a respective differential channel coefficient of the set of differential channel coefficients, wherein the set of differential channel coefficients and the second set of differential channel coefficients are transmitted according to a second periodicity different from the first periodicity.

74. The apparatus of claim 71, wherein the instructions are further executable by the one or more processors to cause the apparatus to:

transmit, to the UE, an indication instructing the UE to enable transmission of the set of differential channel coefficients, wherein receiving the set of differential channel coefficients is based at least in part on transmitting the indication.

75. The apparatus of claim 71, wherein the instructions are further executable by the one or more processors to cause the apparatus to:

transmit, to the UE, an indication instructing the UE to use a differential encoding procedure based at least in part on a mobility of the UE or a time interval between the message indicating the set of channel coefficients and a previous message indicating a previous set of channel coefficients.

76. The apparatus of claim 67, wherein the instructions are further executable by the one or more processors to cause the apparatus to:

transmit, to the UE, an indication of an ordering of the set of spatial domain basis functions for the two-dimensional model.

77. The apparatus of claim 76, wherein:

the indication comprises a configuration for the spatial model that includes a list of spatial domain basis functions; and the list of spatial domain basis functions corresponds to the ordering of the set of spatial domain basis functions.

78. The apparatus of claim 67, wherein the instructions are further executable by the one or more processors to cause the apparatus to:

transmit, to the UE, an indication of an ordering of a set of time domain basis functions for the two-dimensional model.

79. The apparatus of claim 67, wherein the instructions are further executable by the one or more processors to cause the apparatus to:

receive an indication of an ordering of the set of spatial domain basis functions, an ordering of a set of time domain basis functions, or both, for the two-dimensional model.

80. The apparatus of claim 67, wherein the instructions are further executable by the one or more processors to cause the apparatus to:

transmit, to the UE, an indication of a number of timings for the two-dimensional model.

81. The apparatus of claim 67, wherein the instructions are further executable by the one or more processors to cause the apparatus to:

receive, from the UE, an indication of a number of timings of a plurality of timings for the two-dimensional model.

82. The apparatus of claim 67, wherein the instructions are further executable by the one or more processors to cause the apparatus to:

transmit, to the UE, an indication of the set of antenna port pairs, wherein each antenna port pair is associated with the UE or the base station.

\* \* \* \* \*